(12) United States Patent
Ishino

(10) Patent No.: US 7,759,917 B2
(45) Date of Patent: Jul. 20, 2010

(54) POWER SUPPLY UNIT AND PORTABLE APPARATUS USING THE SAME

(75) Inventor: Tsutomu Ishino, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 12/133,274

(22) Filed: Jun. 4, 2008

(65) Prior Publication Data

US 2008/0284402 A1 Nov. 20, 2008

Related U.S. Application Data

(62) Division of application No. 11/005,953, filed on Dec. 7, 2004, now Pat. No. 7,397,151.

(30) Foreign Application Priority Data

Dec. 10, 2003 (JP) ............................. 2003-411355
Sep. 28, 2004 (JP) ............................. 2004-282306

(51) Int. Cl.
*G05F 1/59* (2006.01)
*G05F 1/575* (2006.01)

(52) U.S. Cl. ..................... 323/268; 323/269; 323/272

(58) Field of Classification Search ............... 323/223, 323/224, 225, 226, 268, 269, 271, 272, 273, 323/274, 282, 284, 285
See application file for complete search history.

(56) References Cited

U.S. PATENT DOCUMENTS

| 6,072,333 | A | 6/2000 | Tsukagoshi et al. | 326/58 |
| 6,229,289 | B1* | 5/2001 | Piovaccari et al. | 323/268 |
| 6,646,424 | B2 | 11/2003 | Zinn et al. | 323/268 |
| 6,972,546 | B2 | 12/2005 | Kobayashi | 323/225 |
| 7,397,151 | B2* | 7/2008 | Ishino | 307/150 |
| 2003/0193318 | A1 | 10/2003 | Ozawa et al. | 320/132 |

FOREIGN PATENT DOCUMENTS

| JP | 2001-211640 | 8/2001 |
| JP | 2002-300769 | 10/2002 |
| JP | 2003216247 A | 7/2003 |

* cited by examiner

*Primary Examiner*—Gary L Laxton
(74) *Attorney, Agent, or Firm*—Hogan Lovells US LLP

(57) ABSTRACT

A power supply unit comprises a series regulator and a switching DC-DC converter controlled by a PWM signal and connected in parallel with the series regulator, which are switchably enabled by a mode instruction signal depending on the magnitude of a load current. In switching the series regulator and the DC-DC converter, they are simultaneously enabled for a predetermined overlapping time. Further, in changing the operating condition of the DC-DC converter, the width of the PWM signal is shortened to extend the dead time of the DC-DC converter by a predetermined period, thereby suppressing free oscillations and accompanying overshoots that could take place in the power supply unit during switching.

6 Claims, 16 Drawing Sheets

POWER SUPPLY UNIT AND PORTABLE APPARATUS USING THE SAME

CROSS-REFERENCE TO THE RELATED APPLICATIONS

This application is a divisional of application Ser. No. 11/005,953 filed Dec. 7, 2004, the entire contents of which are incorporated herein by reference. This application also claims benefit of priority under 35 U.S.C. §119 to Japanese Patent Application No. 2003-411355 filed Dec. 10, 2003 and Japanese Patent Application No. 2004-282306 filed Sep. 28, 2004, the entire content of both of which are incorporated here in by reference.

FIELD OF THE INVENTION

This invention relates to a power supply unit capable of suppressing wasteful power consumption of the power supply unit itself when a load connected thereto is light to thereby operate the unit at an improved efficiency. The invention also relates to a portable apparatus, such as a cellular phone, personal computer, and PDA, equipped with such power supply unit.

BACKGROUND OF THE INVENTION

There have been widely used switching DC-DC converters for converting an input voltage into a required output voltage by switching the input voltage.

Although this type of DC-DC converters has fairly large energy consumption of itself, they can provide power efficiently to a rather heavy load since they have high power conversion efficiency. Unfortunately, when the load is light (less than a threshold level), the power consumption rate of themselves is comparatively large that their overall power conversion efficiency is low.

In order to avoid such loss of conversion efficiency when connected to a light load, a DC-DC converter is used along with a series regulator that consumes a little power, in spite of the fact that the series regulator has low power conversion efficiency. Thus, the DC-DC converter is used when the load is heavy, and the series regulator is used when the load is light, thereby improving the overall power consumption efficiency (see for example, Japanese Patent Applications Laid Open 2002-300769 and 2001-211640).

The prior art power supply unit is adapted to selectively operate either one of the DC-DC converter and the series regulator depending on the condition of the load being heavy of light. However, there is a possibility that the switching is not smoothly executed then. Furthermore, a sudden change in the electric power supplied to a smoothing coil and a smoothing capacitor may cause free oscillations and/or an overshoot in the unit. In the worst case, voltage fluctuations can reset other control circuits.

SUMMARY OF THE INVENTION

As a consequence, it is an object of the invention to provide a power unit having a DC-DC converter and a series regulator adapted to be smoothly switched from one to the other for selective operation. It is another object of the invention to provide a portable apparatus equipped with such power supply unit as described above providing power to the apparatus in a stable manner with a high power conversion efficiency.

A power supply unit in accordance with a first embodiment of the invention comprises:

a series regulator for converting an input voltage into a predetermined output voltage in a continuously controlled manner and outputting the output voltage from the output end thereof; and a switching DC-DC converter for converting the input voltage into a predetermined output voltage, the switching DC-DC converter connected at the output end thereof in parallel with the output end of the series regulator, wherein the power supply unit has a mode (regulator mode) in which only the series regulator is operated and a mode (converter mode) in which only the switching DC-DC converter is operated, the power supply unit adapted to switch from the regulator mode to the converter mode and vice versa in response to a mode instruction signal, and wherein the power supply unit has overlapping periods in which the series regulator and switching DC-DC converter are simultaneously operated for predetermined periods of time when switching is made between a regular mode and a converter mode.

The inventive power supply unit may comprise:

a series regulator that is enabled by a first enable signal to convert an input voltage into a predetermined output voltage in a continuously controlled manner and outputting the output voltage from the output end thereof;

a switching DC-DC converter enabled by a second enable signal to convert the input voltage into a predetermined output voltage through switching of the input voltage, the DC-DC converter connected in parallel at the output end thereof with the output end of the series regulator; and a switching circuit for selectively switching the first and second enable signals in response to a mode instructing signal and for outputting the selected: enable signal such that, when switching the first enable signal to the second enable signal, the first and second enable signals overlap each other for a first predetermined period of time, and when switching the second enable signal to a first enable signal, overlap each other for a second predetermined period.

The switching DC-DC converter may include an error amplification circuit for controlling the output voltage in accordance with the difference between a reference voltage and a voltage representing the output voltage, wherein the error amplification circuit has an AC and a DC feedback circuits that are switchable, and the AC feedback circuit is switched to the DC. feedback circuit during the overlapping period.

The switching DC-DC converter may include:

a first and a second switches connected in series between power sources, the first and second switches adapted to turn on alternately but turn off simultaneously for a dead time;

a smoothing coil and a smoothing capacitor for smoothing the switching output voltage appearing at the node of the first and second switches to generate the output voltage; and a pulse width control circuit for generating, and providing the first and second switches with, a switching control signal based on a pulse width modulation (PWM) signal that is modulated so as to enable generation of the predetermined output voltage. The pulse width control circuit may be adapted to shorten the width of the PWM signal based on the mode instruction signal to extend the dead time by a third or a fourth predetermined period when the switching DC-DC converter is enabled from its disabled state or disabled from its enabled state.

The switching DC-DC converter may include:

a first and a second switches connected in series between power sources and adapted to turn on alternately but turn off simultaneously for a dead time;

a smoothing coil and a smoothing capacitor for smoothing the switching output voltage appearing at the node of the first and second switches to generate the output voltage; and a pulse width control circuit for generating, and providing the first and second switches with, a switching control signal based on a PWM signal that is modulated so as to enable generation of the predetermined output voltage, wherein the pulse width control circuit is adapted to shorten the dead time in multiple stages from a predetermined long time to a predetermined short time by regulating the width of the PWM. signal when the switching DC-DC converter is enabled from its disabled state, and/or adapted to extend the dead time in multiple stages from a predetermined short time to a predetermined long time by regulating the width of the PWM signal when the. . Switching DC-DC converter is disabled from its enabled state.

The inventive power supply unit may comprise:

a series regulator that is enabled by a first enable signal to convert an input voltage into a predetermined output voltage in a continuously controlled manner and outputting the output voltage from the output end thereof;

a switching DC-DC converter that is enabled by a second enable signal to convert the input voltage into a predetermined output voltage through switching of the input voltage, the DC-DC converter connected at the output end thereof in parallel with the output end of the series regulator; and a switching circuit for selectively switching the first and second enable signals in response to a mode instruction signal, wherein the switching DC-DC converter includes:

a first and a second switches connected between power sources, the first and second switches adapted to turn on alternately but turn off simultaneously for a dead time;

a smoothing coil and a smoothing capacitor for smoothing the voltage appearing at the node of the first and second switches to generate the output voltage; and a pulse width control circuit for generating, and providing the first and second switches with, a switching control signal based on a PWM signal that is modulated so as to enable. generation of the predetermined output voltage, and wherein the pulse width control circuit may be adapted to shorten the width of the PWM signal based on the mode instruction signal to extend the dead time by a third or a fourth predetermined period when switching DC-DC converter is enabled from its disabled state or disabled from its enabled state.

The pulse width control circuit may include:

an error amplifier for comparing a feedback voltage representing the output voltage with a reference voltage to generate an error signal in accord with the difference between the feedback voltage and reference voltage;

an oscillator for generating a triangular wave signal;

a PWM comparator for comparing the error signal and triangular wave signal to generate a PWM signal;

a predriver for amplifying the PWM signal by cascaded inverters and providing the amplified signal to the first and second switches; and delay time control means provided in one of the cascaded inverters and operable for the third and fourth predetermined periods, thereby extending the dead time.

The inventive power supply unit may be provided with a series regulator that is enabled by a first enable signal to convert an input voltage into a predetermined output voltage in a continuously controlled manner and outputting the output voltage from the output end thereof;

a switching DC-DC converter that is enabled by a second enable signal to convert the input voltage into a predetermined output voltage through switching of the input voltage, the DC-DC converter connected at the output end thereof in parallel with the output end of the series regulator; and a switching circuit for selectively switching the first and second enable signals in response to a mode instruction signal, wherein the switching DC-DC converter includes:

a first and a second switches connected between power sources, the first and second switches adapted to turn on alternately but turn off simultaneously for a dead time:

a smoothing coil and a smoothing capacitor for smoothing the voltage appearing at the node of the first and second switches to generate the output voltage; and a pulse width control circuit for generating, and providing the first and second switches with, a switching control signal based on a PWM signal that is modulated so as to enable generation of the predetermined output voltage, and wherein the pulse width control circuit is adapted to shorten the dead time in multiple stages from a predetermined long time to a predetermined short time by regulating the width of the PWM signal when the switching DC-DC converter is enabled from its disabled state, and/or adapted to extend the dead time in multiple stages from a predetermined short time to a predetermined long time by regulating the width of the PWM signal when the switching DC-DC converter is disabled from its enabled state.

The pulse width control circuit may include:

an error amplifier for comparing a feedback voltage representing the output voltage with a reference voltage to generate an error signal in accord with the difference between the feedback voltage and reference voltage;

an oscillator for generating a triangular wave signal;

a PWM comparator for comparing the error signal and triangular wave signal to generate a PWM signal;

a predriver for amplifying the PWM signal by cascaded inverters and providing the amplified signal to the first and second switches; and delay time control means provided in one of the cascaded inverters, for changing the dead time by controlling the delay time of the delay time control means in multiple stages.

The first enable signal may be formed by a first logic circuit that receives the mode instruction signal and a first counter output issued from a first counter counting clock pulses of the clock supplied from the switching DC-DC converter. The second enable signal may be formed by a second logic circuit that receives the mode instruction signal and a second counter output issued from a second counter counting clock pulses of the clock.

The inventive power supply unit may comprise:

a first power supply circuit for converting an input voltage into a predetermined output voltage, the first power supply circuit having a power conversion efficiency that is high for a light load but decreases with the magnitude of the load;

a second power supply circuit for converting the input voltage into a predetermined output voltage, the second power supply circuit having an output end connected to the output end of the first power supply circuit and having a power conversion efficiency that is lower than the high efficiency of the first power supply circuit for a light load but increases with the magnitude of the load and exceeds that of the first power supply circuit when the load exceeds a threshold, wherein the first and second power supply circuits are switchable depending on the magnitude of the power to be supplied from the power supply circuits to the load, and the first and second power supply circuits are in operation simultaneously supplying their power for a common overlapping period when switching is made between the first and second power supply circuits.

The switching may be carried out in advance prior to actual increase and decrease in load based on a prediction that the power to be supplied from the first and second power supply circuits to the load would increase or decrease, overpassing the threshold.

A portable apparatus according to the invention comprises:
a battery for generating a power supply voltage;
a power supply unit supplied with the source voltage as an input voltage thereto as defined in any one of claims 1 through 21; and
control means for controlling the power supply unit.

The inventive power supply unit operates a switching DC-DC converter in the form of the second power supply circuit when the load connected to the power supply unit is heavy. Although the DC-DC converter exhibits a large self current consumption, its conversion efficiency for generating an output power for a given input power is high that the converter is effective especially when the load current increases for a heavy load. When the load is light, the first power supply circuit in the form of a series regulator is operated. Although the series regulator has lower power conversion efficiency than the DC-DC converter, the series regulator has less self current consumption than that of the DC-DC converter; the former is efficient for a light load. Accordingly, the overall conversion efficiency can be improved by switching the DC-DC converter and the series regulator depending on the load being heavy or light.

It is noted that in switching from one to the other of the series regulator operable with the first enable signal and the DC-DC converter operable with the second enable signal, the first and second enable signals are selectively output based on the mode instruction signal, and that the first and second enable signals overlap each other for a first and a second predetermined periods during switching. Thus, the series regulator and the DC-DC converter can be smoothly switched over from each other. The overlapping period can be provided by simple means for counting clock pulses of the clock supplied from the DC-DC converter.

The pulse width of the PWM signal supplied to the DC-DC converter is shortened to extend the dead time when the DC-DC converter is enabled from its disabled state and when disabled from its enabled state. Thus, generation of free oscillations or an overshoot accompanying the switching of the DC-DC converter and the series regulator can be suppressed. Shortening of the pulse width can be attained in a simple manner by connecting a delay capacitor or delay resistor to either one of the cascaded inverters in the predriver for a predetermined period of time.

Moreover, during turning on or off (i.e. enabling or disabling) the DC-DC converter from its disabled state or from enabled state, the dead time can be altered in several steps from a predetermined short time to a predetermined long time, or vice versa, by regulating the pulse width of the PWM signal. This stepwise alteration of the dead time permits further suppression of the generation of free oscillations and an overshoot accompanying the switching of the DC-DC converter and the series regulator.

The response of the error amplifier of the switching DC-DC converter may be improved by switching the AC feedback circuit to the DC feedback circuit during the overlapping period thereby raising the gain of the amplifier in a high frequency domain thereof. This minimizes the influence of free oscillations, overshoots, and undershoots on the output voltage during switching between the DC-DC converter and the series regulator.

DETAILED DESCRIPTION OF THE PREFERRED EMBODIMENTS

A power supply unit in accordance with the invention comprises:

a first power supply circuit for converting an input voltage into a predetermined output voltage, the first power supply circuit having a power conversion efficiency that is high for a light load but decreases with the magnitude of the load; and a second power supply circuit for converting the input voltage into a predetermined output voltage, the second power supply circuit having a power conversion efficiency that is lower than the high efficiency of the first power supply circuit for a light load but increases with the magnitude of the load and exceeds the efficiency of the first power supply circuit when the load exceeds a threshold.

The first and second power supply circuits are connected in parallel at the output ends thereof to supply electric power to the load. When the load is below the threshold, the first power supply circuit has a higher power conversion efficiency than the second power supply circuit, but has a lower power conversion efficiency than the second power supply circuit when the load exceeds the threshold.

The first and second power supply circuits are switched over from one to the other by an instruction signal received from a controller to provide power to the load with a maximized overall power conversion efficiency in accord with the magnitude of the load.

In switching the first and second power supply circuits, a predetermined overlapping period is set up in which both of the power supply circuits are in operation simultaneously providing power. In addition, the switching is preferably performed in advance prior to an actual increase or decrease in load based on a prediction that the power to be supplied from the first and second power supply circuits to the load would increase or decrease, overlapping the threshold.

The inventive power supply unit will now be described in detail by way of example along with a portable apparatus utilizing the power supply unit with reference to the accompanying drawings.

Figure 1:
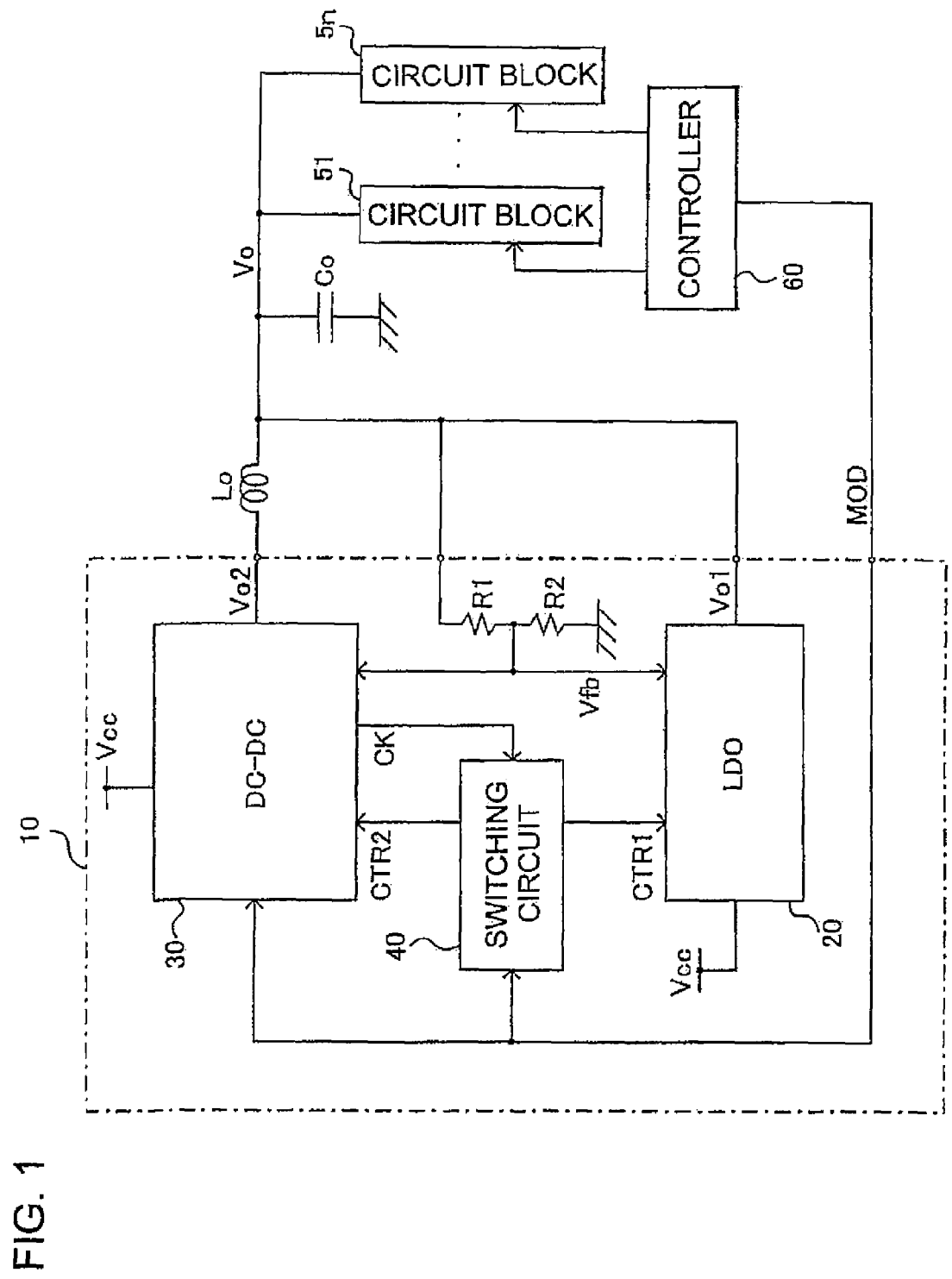
FIG. 1 is a block diagram showing the structure of a power supply unit in accordance with a first embodiment of the invention and a portable apparatus of the invention.

FIG. 1 is a diagram showing structures of a power supply unit and a portable apparatus in accordance with a first embodiment of the invention. A power supplying IC 10 shown in FIG. 1 comprises:

a series regulator or low-drop-out (LDO) regulator 20 in the form of a first power supply circuit for converting an input voltage Vcc supplied from a battery (not shown) into a predetermined output voltage Vo1 through continuous control of the input voltage Vcc;

a switching DC-DC converter section 30 in the form of a second power supply circuit for generating a switching output voltage Vo2 through switching of the power source voltage Vcc; and a switching circuit 40 for switching the LDO and the switching DC-DC converter section 30.

In response to a mode instruction signal MOD received from an external controller 60 and in accordance with the level of the mode instruction signal MOD being high (H) or low (L), the switching circuit 40 switches a first enable signal CTR1 to be supplied to the LDO regulator 20 and a second enable signal CTR2 to be supplied to the DC-DC converter section 30. The switching circuit 40 is adapted to overlap the first enable signal CTR1 and the second enable signal CTR2 each other for a first predetermined period T1 when switching the first enable signal CTR1 to the second enable signal CTR2, and cause them to overlap each other for a second predetermined period T2 when switching the second enable signal CTR2 to the first enable signal CTR1.

Resistors R1 and R2 are voltage dividing resistors for forming a feedback voltage Vfb to be fed back to the LDO regulator 20 and the DC-DC converter section 30. The voltage dividing resistors R1 and R2 are supplied with an output voltage Vo.

The output voltage Vo is obtained by smoothing the switching output voltage Vo2 of the DC-DC converter section 30 by a smoothing coil Lo and a smoothing capacitor Co. Thus, the DC-DC converter section 30, smoothing coil Lo, and smoothing capacitor Co constitute a switching DC-DC converter. The regulator output voltage Vo1 of the LDO regulator 20 equals the output voltage Vo.

Circuit blocks 51-5n represent various circuitries provided in the portable apparatus, which are loads coupled to the power supply unit. These circuit blocks 51-5n ranges from a small circuit block that consumes only small power to a large circuit block such a DSP and an infrared transmission section that consumes large power. In operation, these circuit blocks 51-5n are impressed with the output voltage Vo of the power supply unit.

The controller 60 includes a CPU and controls operation of the portable apparatus. Power is supplied to the circuit blocks 51-5n under the control of the controller 60. Thus, the controller 60 grasps all information including degrees of power consumption by the circuit blocks 51-5n and necessary timing of the power consumption.

The mode instruction signal MOD is controlled based on power supply information issued from the controller 60 to the blocks 51-5n. Hence, it is not necessary to provide a current detection circuit for detecting load current. It should be appreciated that, if a shift from a light load to a heavy condition is predicted, a predictive control can be easily established in which power supply from the LDO regulator 20 may be switched to the power supply from the DC-DC converter section 30 in advance prior to an actual shift of the load.

Before preceding to the description of operation of the inventive power supply unit 10, the LDO regulator 20, DC-DC converter section 30, and switching circuit 40, constituting major. components of the power supply unit 10, will now be described with reference to FIGS. 2-4.

Figure 2:
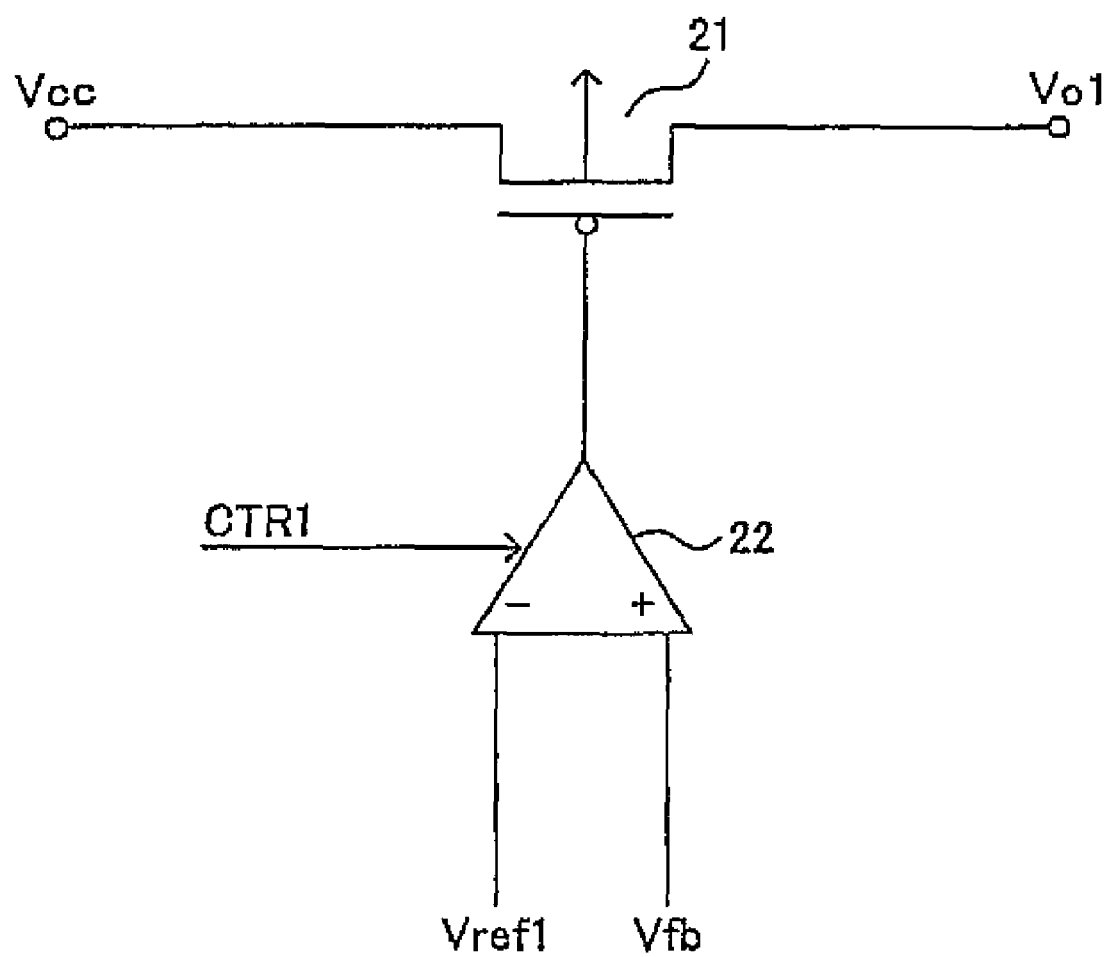
FIG. 2 is a diagram showing the structure of a series regulator (LDO regulator).

As shown in FIG. 2, the LDO regulator 20 is supplied with the power source voltage Vcc, which controls the electric conductivity of a P-type MOS transistor 21 outputting the regulator output voltage Vo1. The gate of the P-type MOS transistor 21 is coupled to the error output of an error amplifier 22 that receives a first reference voltage Vref1 and the feedback voltage Vfb as the two inputs thereto. The conductivity of the P-type MOS transistor 21 is controlled so as to equilibrate the first reference voltage Vref1 with the feedback voltage Vfb to provide the predetermined output voltage Vo1.

The error amplifier 22 is supplied with a first enable signal CTR1, which controls the operational condition of the error amplifier 22, and hence the operating condition of the LDO regulator 20. In the embodiment shown herein, the first enable signal CTR1 supplied to the error amplifier 22 normally has a low level (L level). Thus, the LDO regulator 20 will be in operation when the first enable signal CTR1 has L level, while the LDO regulator 20 will be halted (disenabled) when the signal has a high level (H level).

Figure 3:
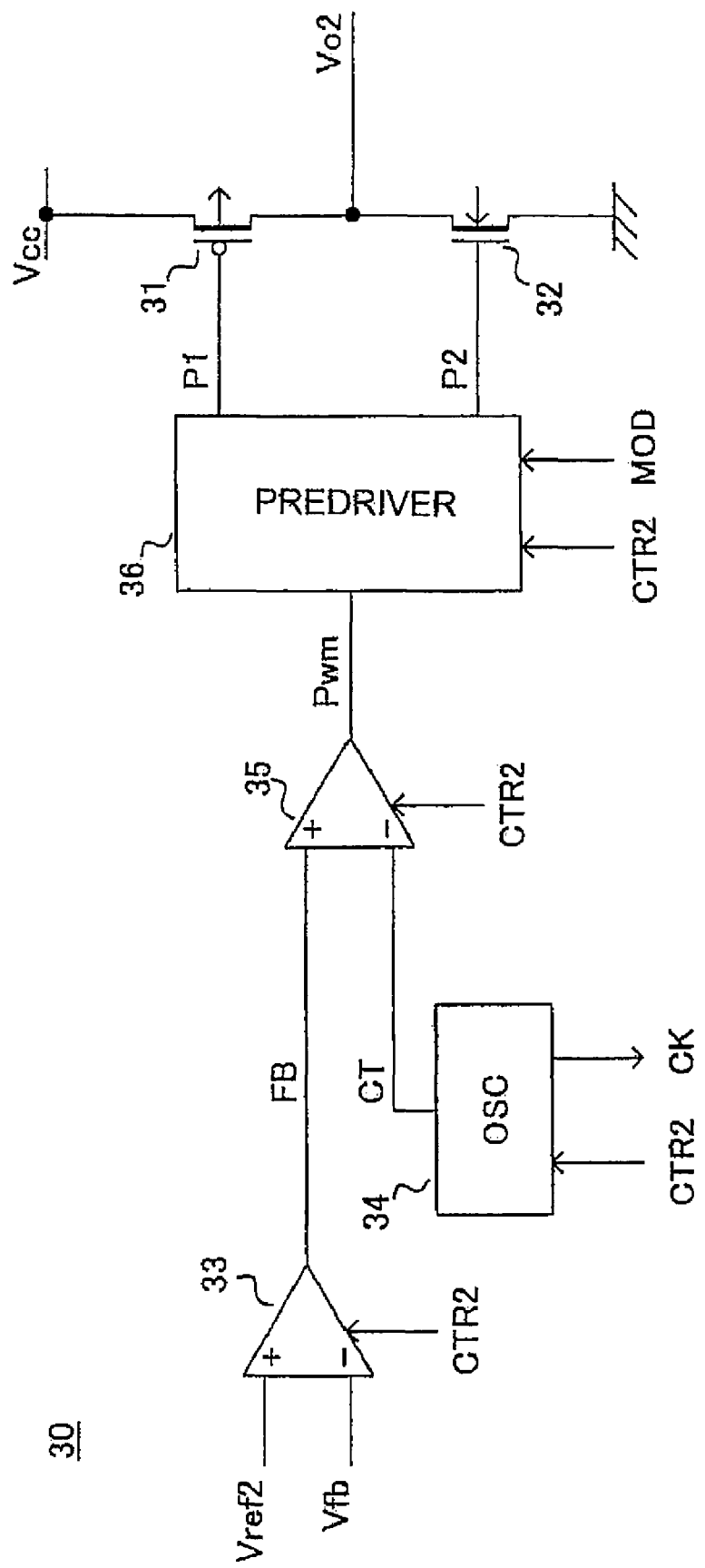
FIG. 3 is a diagram showing the structure of a switching DC-DC converter.

Referring to FIG. 3, there is shown the DC-DC converter section 30, in which a P-type MOS transistor 31 and an N-type MOS transistor 32 are connected in series between the power source voltage Vcc and the ground. The MOS transistors 31 and 32 are respectively provided at the gates thereof with pulse-width controlled switching control signals P1 and P2. A switching output voltage Vo2 is provided at the serial node of the MOS transistors 31 and 32, which voltage is smoothed by the smoothing coil Lo and the smoothing capacitor Co before the voltage is output as the output voltage Vo. Both the MOS transistors 31 and 32 are provided with a common dead time in which both of them are turned off. This prevents generation of a penetration current that passes through the MOS transistor 31 and transistor 32.

An error amplification circuit 33 is supplied as the two inputs thereto with a second reference voltage Vref2 and the feedback voltage Vfb, outputting an error signal FB in accord with the difference between the two inputs.

An oscillator (OSC) 34 generates a clock CK and a triangular wave signal CT having a predetermined frequency (for example, about 1 MHz). For structural simplicity, the clock CK is preferably synchronized with the triangular wave signal CT.

A pulse width modulation (PWM) comparator 35 compares the error signal FB with the triangular wave signal CT and generates a PWM signal Pwm based on the comparison.

A predriver 36 amplifies the PWM signal Pwm and generates switching control signals P1 and P2 of required polarities for driving the MOS transistors 31 and 32. The predriver 36 is supplied with the mode instruction signal MOD. Based on the mode instruction signal MOD, the predriver 36 regulates the pulse widths of the switching control signals P1 and P2 to shorten the on-periods of the respective MOS transistors 31 and 32 when the DC-DC converter section 30 is enabled and disenabled, thereby extending the period (dead time) in which both the MOS transistors 31 and 32 are turned off simultaneously.

The second enable signal CTR2 is supplied to each of the circuits 33-36 of the DC-DC converter section 30 to control the operating conditions thereof, and hence the operating condition of the DC-DC converter section 30. In the embodiment shown herein, the second enable signal CTR2 is normally supplied at L level. That is, the DC-DC converter section 30 will be in operation when the second enable signal CTR2 has L level, while the DC-DC converter section 30 will be disenabled (halted) when the second enable signal CTR2 has H level.

Figure 4:
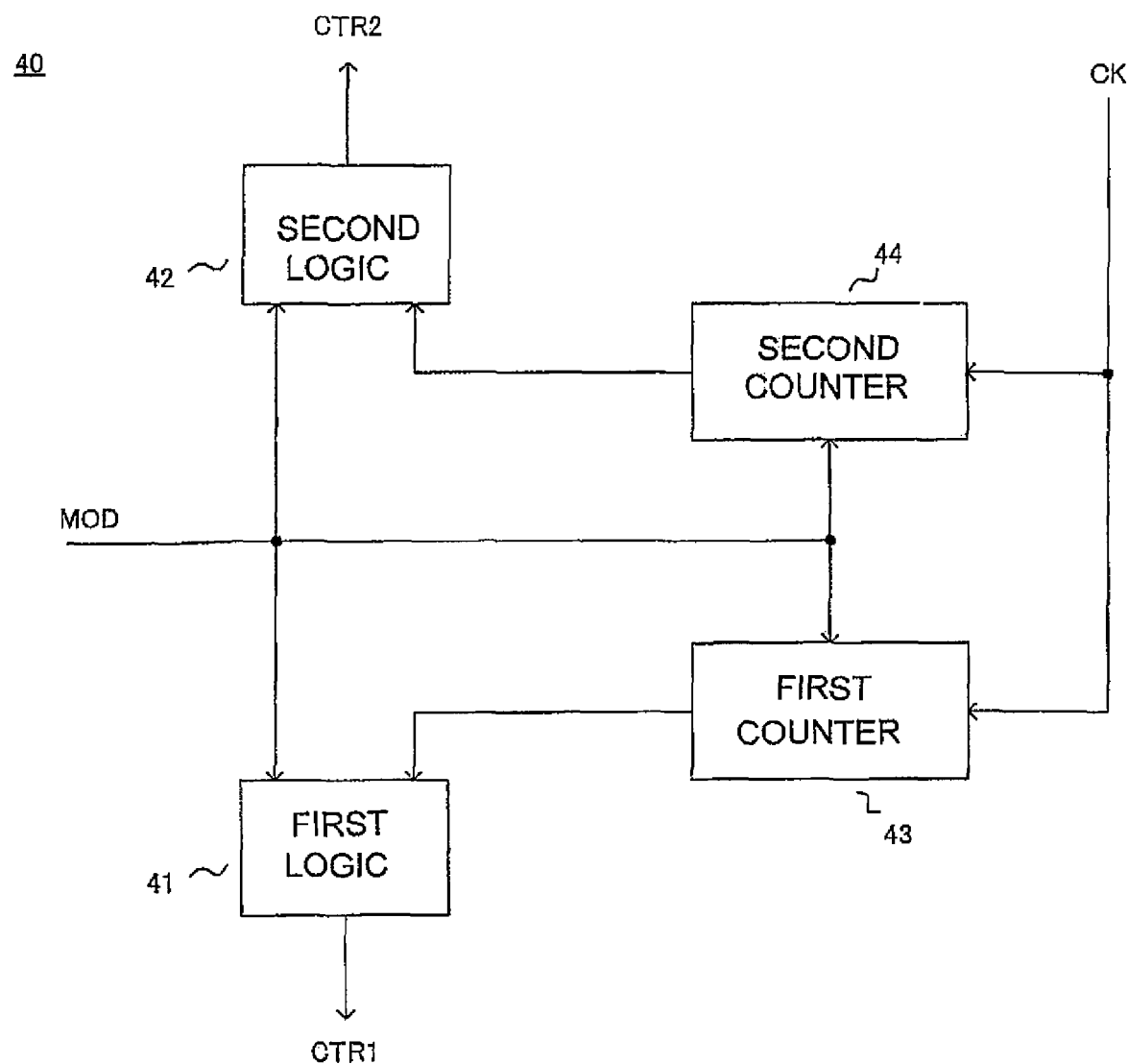
FIG. 4 is a block diagram showing the exemplary structure of a switching circuit.

Referring to FIG. 4, there is shown the switching circuit 40 including a first logic circuit 41, a second logic circuit 42, a first counter 43, and a second counter 44, each supplied with the mode instruction signal MOD.

The first counter 43 is also supplied with the clock CK along with the mode instruction signal MOD. In the example shown herein, the second counter 44 starts counting the number of clock pulses of the clock CK when the mode instruction signal MOD goes up to H level, providing a count that amounts to the first predetermined period T1. The first logic circuit 41 is supplied with the output of the first counter 43 along with the mode instruction signal MOD. The first logic circuit 41 provides the first enable signal CTR1 that is pulled up to H level the first predetermined period T1 after the mode instruction signal MOD goes up to H level, but is pull down simultaneously when the mode instruction signal MOD goes down to L level.

Each of the first logic circuit 41 and the first counter 43 can be of any type so long as they can perform such logical input-output operation as described above. For example, the first logic circuit 41 can be an AND circuit if the first counter 43 is configured to provide an output that remains low (L level) while the mode instruction signal MOD is low, and, when the mode instruction signal MOD goes high (H level), is pulled up to H level time T1 after the mode instruction signal MOD, and is pulled down to L level when the mode instruction signal MOD goes down to L level later.

The second counter 44 is supplied with the mode instruction signal MOD and clock CK, and, in the example shown herein, starts counting the clock CK when the mode instruction signal MOD goes down to L level to count the number of clock pulses that amounts to the second predetermined period T2. The second logic circuit 42 is supplied with the mode instruction signal MOD and the output of the second counter 44. The second logic circuit 42 is pulled down to L level at the moment when the mode instruction signal MOD goes high from L level, outputting the second enable signal CTR2 the second predetermined period T2 after the mode instruction signal MOD was pulled down to L level.

Each of the second logic circuit 42 and the second counter 44 can be of any type so long as they can perform such logic input-output operation as described above. For example, the second logic circuit 42 can be a NOR circuit provided that the second counter 42 is configured such that the output of the second counter 44 has L level when the mode instruction signal MOD is at L level and the output goes up to H level simultaneously when the mode instruction signal MOD goes up to H level and that the output goes down to L level from H level the second predetermined period T2 after the mode instruction signal MOD goes down to L level.

Figure 5:
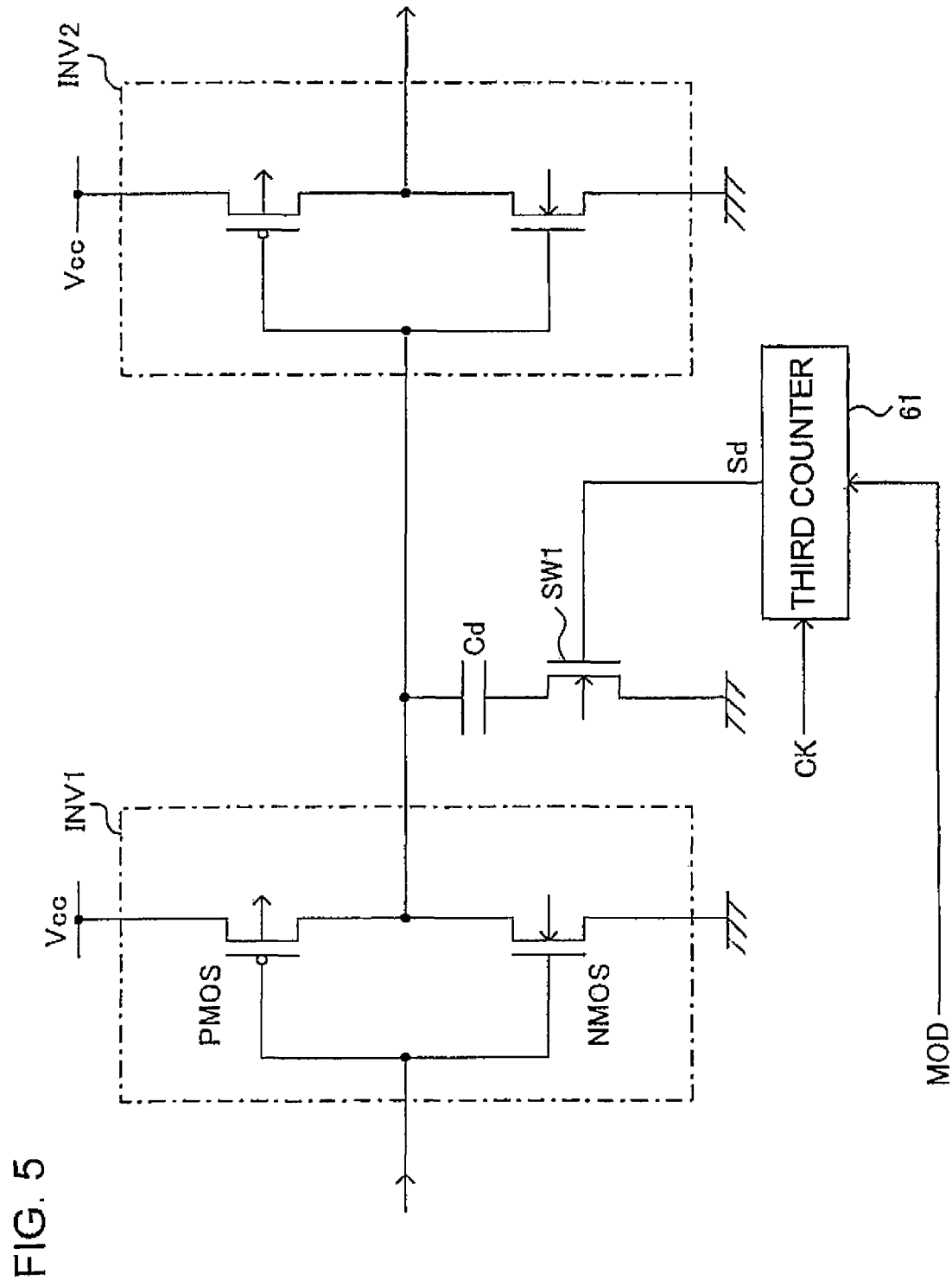
FIG. 5 shows means for regulating pulse widths.

FIG. 5 shows the structure of a first exemplary predriver 36 having delay time control means for regulating the pulse widths of the switching control signals P1 and P2. The predriver 36 has a multiplicity of cascaded CMOS inverters INV1, INV2, . . . to amplify the PWM signal Pwm and generate the switching control signals P1 and P2 having required polarities to drive the MOS transistors 31 and 32.

Connected to an appropriate point in the cascaded inverters, for example a point at the output side of the inverter INV1, is a delay capacitor Cd, which is grounded via a switch SW1 such as an N-type MOS transistor, as shown in FIG. 5. In order to regulate charging and discharging time of the delay capacitor Cd, a resistor (not shown) may be connected to the inverter INV1, connected to a point of the inverter INV1 on the side of the PMOS transistor and NMOS transistor. A third counter 61 is supplied with the clock CK and the mode instruction signal MOD and outputs a delay signal Sd for turning on the switch SW1.

When the mode instruction signal MOD goes up from L level to H level, the third counter 61 starts counting clock pulses of the clock CK, and outputs the delay signal Sd until it counts a number of clock pulses that amounts to a third predetermined period T3. The switch SW1 is turned on by the delay signal Sd, connecting the delay capacitor Cd to the ground. When the delay capacitor Cd connected is grounded, rise and fall of the output voltage of the inverter INV1, i.e. the input voltage to the inverter INV2, is delayed in accordance with the capacitance of the delay capacitor Cd. As a consequence, if the drive power of the PMOS transistor of the inverter INV1 is smaller than that of the NMOS transistor, the pulse width of an L level pulse output from the inverter INV2 will be shortened accordingly. Thus, the periods in which the MOS transistors 31 and 32 turn on (the periods referred to as on-periods) become short as compared with the on-periods with the delay capacitor Cd disconnected.

When the mode instruction signal MOD goes low from H level, the third counter 61 starts counting clock pulses of the clock CK and outputs a delay signal Sd for a fourth predetermined period T4, starting at the same time as it starts counting the clock pulses of the clock CK for the fourth predetermined period T4. In this case also, on-periods of the MOS transistors 31 and 32 becomes short accordingly.

Figure 6:
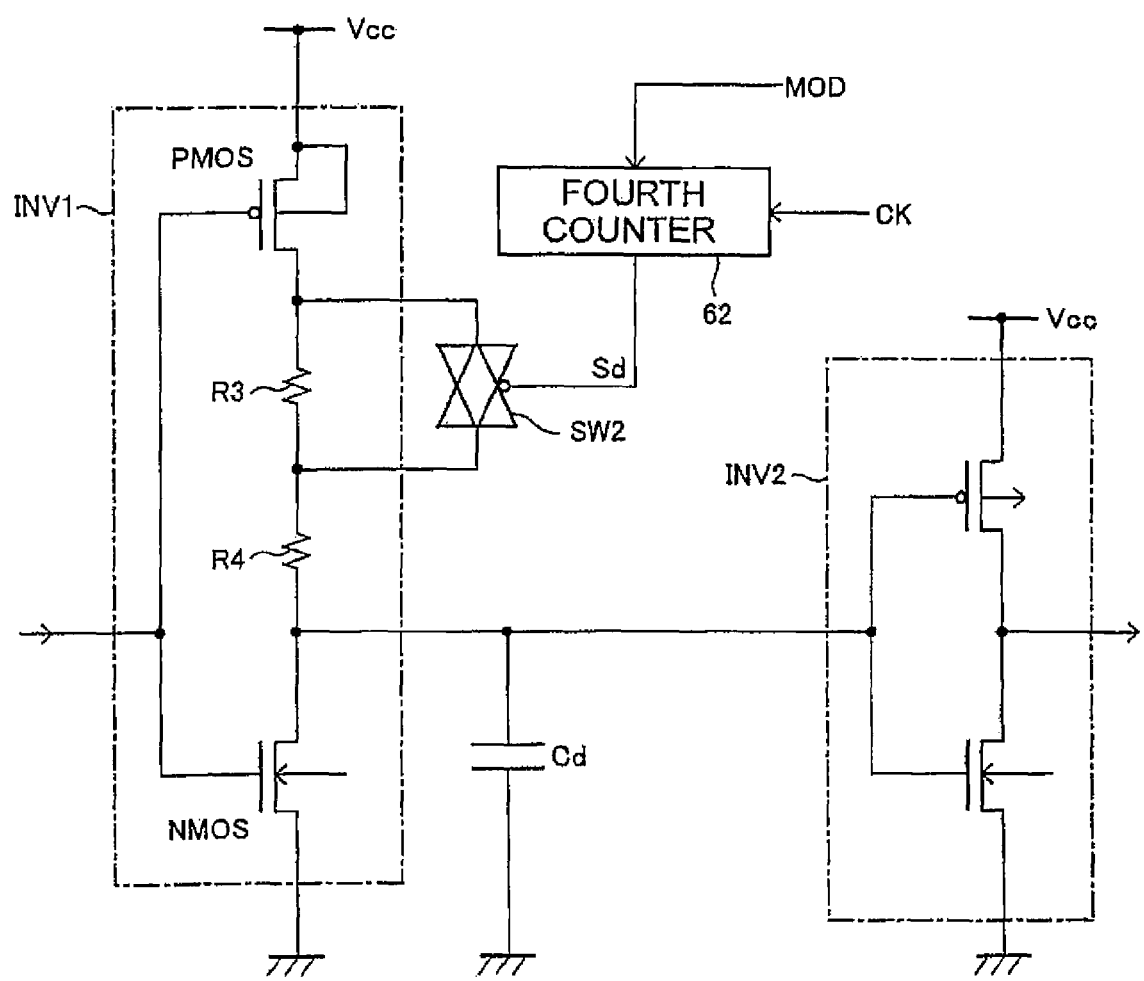
FIG. 6 shows another exemplary pulse width regulating circuit.

FIG. 6 shows the structure of a second exemplary predriver 36 having delay time control means for regulating the pulse widths of the switching control signals P1 and P2. As seen in FIG. 6, resistors R3 and R4 are connected in series between the output end of the inverter INV1 and the drain of the PMOS transistor of the inverter INV1. A switch SW2 is connected in parallel with the resistor R3. The delay capacitor Cd is grounded at all times.

A fourth counter 62 providing a delay signal Sd can be the same in structure and in operation as the third counter 61 of FIG. 5. The switch SW2 is turned off by the delay signal Sd supplied from the fourth counter 62. The switch SW2 performs reverse operation relative to the switch SW1. The switch SW2 can be an analog switch having a CMOS structure or a PMOS transistor, for example. The resistor R4 can be omitted.

In the arrangement shown in FIG. 6, when the mode instruction signal MOD goes up from L level to H level, the switch SW2 is turned off by the delay signal Sd, which causes the resistor R3 to be inserted in the inverter INV1. The insertion of the resistor R3 results in an increase of the time constant of the circuitry formed of the resistor R3 and the delay capacitor. Cd. That is, the time constant changes from R4×Cd to (R3+R4)×Cd. This increase in time constant causes the rise of the output voltage of the inverter INV1, or the input voltage of the inverter INV2, to be delayed accordingly. As a consequence, the width of the L level pulse as output from the inverter INV2 is reduced. Thus, the on-periods of the MOS transistors 31 and 32 become shorter as compared with the on-periods thereof with the resistor R3 not connected.

Thus, the on-periods of the MOS transistors 31 and 32 are shortened in the third predetermined period T3 after the DC-DC converter section 30 is enabled and in the fourth predetermined period T4 before the DC-DC converter section 30 is disabled. As a consequence, the dead time in which the MOS transistors 31 and 32 are turned off simultaneously are extended in the third and fourth predetermined periods T3 and T4.

Accordingly, free oscillations and overshoots induced in the smoothing circuitry of the coil Lo and capacitor Co by the DC-DC converter section 30 during its enablement and disenablement are suppressed.

It should be understood that the third predetermined period T3 can be equal to the first predetermined period T1, and the fourth predetermined period T4 equal to the second predetermined period T2. In other words, the delay signal Sd may be output during overlapping periods T1 and T2. In this case, inverted signal of the first enable signal CTR1 can be used as a delay signal Sd.

Instead of extending the dead time of the MOS transistors 31 and 32 during a period of enabling and disenabling the DC-DC converter section 30, the dead time can be extended only when the DC-DC converter section 30 is enabled.

With additional reference to the timing diagrams shown in FIGS. 7 and 8, operation of the first embodiment of the invention will now be described.

Figure 7:
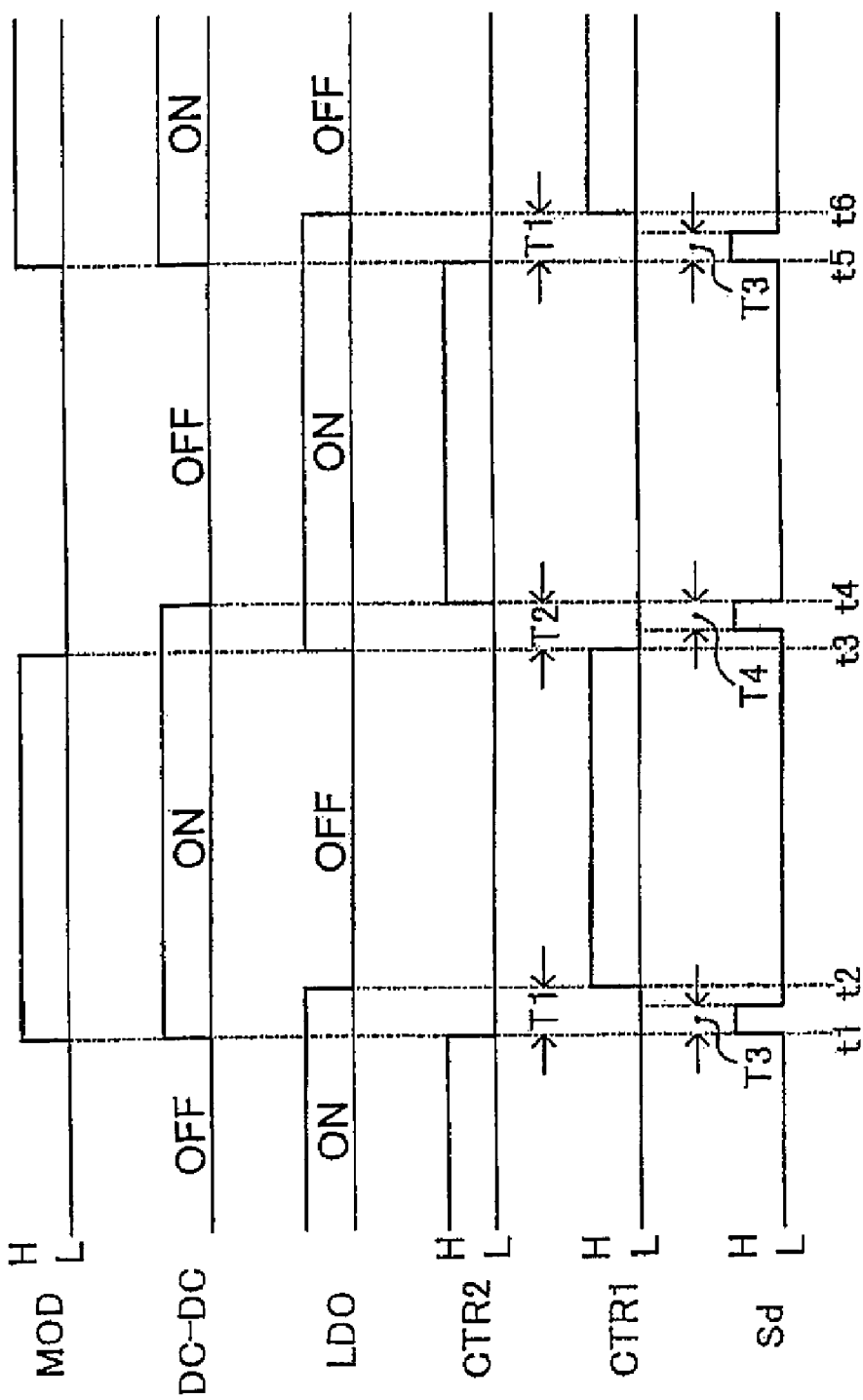
FIG. 7 is a timing diagram describing the switching of a series regulator and a DC-DC converter.

FIG. 7 shows the relationships between the mode instruction signal MOD, conditions of the LDO regulator 20 (indicated as LDO) and DC-DC converter section 30 (indicated as. DC-DC), first and second enable signals CTR and CTR2, respectively, of the switching circuit 40, and the delay signal Sd.

As shown in FIG. 7, before time t1, the mode instruction signal MOD issued from the controller 60 has L level; the first enable signal CTR1 has L level; the LDO regulator 20 is in operation; the second enable signal CTR2 has H level; and the DC-DC converter section 30 is halted.

At time t1, the mode instruction signal MOD goes up from L level to H level, when the second enable signal CTR2 is immediately pulled down to L level, enabling the DC-DC converter section 30.

As the DC-DC converter section 30 is enabled, the clock CK is generated. The first enable signal CTR1 is pulled up to H level at time t2 when the first counter 43 has counted a predetermined number of clock pulses of the clock CK that amounts to the first predetermined period T1 after t1. As the first enable signal CTR1 is pulled up to H level, the LDO regulator 20 is stopped.

As a consequence, in the switching from the LDO regulator 20 to the DC-DC converter section 30, the first predetermined period T1 from t1 to t2 is an overlapping period in which both the LDO regulator 20 and the DC-DC converter section 30 are simultaneously in operation, thereby allowing smooth switching of the LDO regulator 20 to the DC-DC converter section 30.

The mode instruction signal MOD issued from the controller 60 has H level from time t2 to t3, while the second enable signal CTR2 has L level, so that the DC-DC converter section 30 is in operation. Then the first enable signal CTR1 has H level, and the LDO regulator 20 is halted.

As the mode instruction signal MOD goes down from H level to L level at t3, the first enable signal CTR1 is immediately pulled down to L level, operating the LDO regulator 20.

The DC-DC converter section 30 is still in operation even after time t3, continuing generating the clock CK. When the second counter 44 has counted, at time t4, the predetermined number of clock pulses amounting to the second predetermined period T2 after the mode instruction signal MOD went down to L level at time t3, the second enable signal CTR2 is pulled up to H level. As the second enable signal CTR2 is pulled up to H level, the DC-DC converter section 30 stops its operation.

As a consequence, in the switching from the DC-DC converter section 30 to the LDO regulator 20, both of the LDO regulator 20 and the DC-DC converter section 30 are in operation over the period T2 from t3 to t4 (overlapping period), which allows smooth switching from the DC-DC converter section 30 to the LDO regulator 20. Each of the first and second predetermined periods T1 and T2 can be set to an arbitrary length. They can be of the same length (for example, 500 microseconds).

It is noted that the overlapping periods T1 and T2 for the LDO regulator 20 and the DC-DC converter section 30 undergoing switching operation can be implemented by simply counting clock pulses of the clock CK supplied from the DC-DC converter section 30.

Although the DC-DC converter section 30 has a large self current consumption rate, it is efficient for a heavy load requiring a large current, since the converter section 30 has high power conversion efficiency for a given input electric power. The LDO regulator 20 is operated when the load is light. Since the LDO regulator 20 has a small self current consumption rate, it is efficient for a load requiring a small load current. As a consequence, the overall power conversion efficiency of the power supply unit is improved by switching the DC-DC converter and the series regulator in accord with the magnitude of the load current.

Since the mode instruction signal MOD for switching is generated by the controller 60 controlling the circuit blocks 51-5n, a load current detection circuit is not necessary to discern whether the load is heavy or light. Thus, the power supply unit can be simplified accordingly. Moreover, the mode instruction signal MOD is generated by the controller 60 based on the predictive behaviors of the circuit blocks 51-5n. Thus, an adequate switching of the LDO regulator 20 and the DC-DC converter section 30 can be performed by predicting a change in load.

Figure 8:
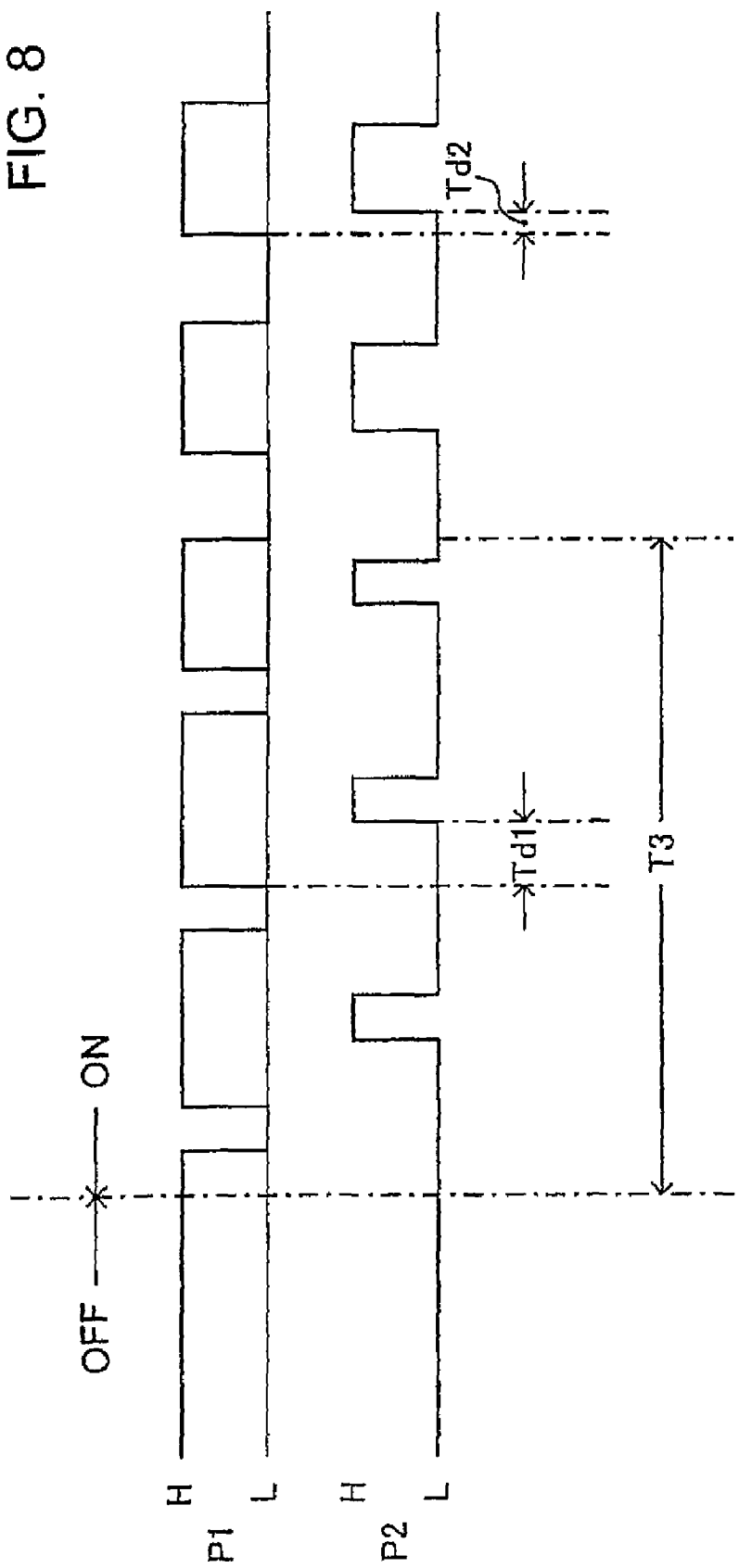
FIG. 8 is diagram describing a switching control signal during pulse width regulation.

Referring to FIG. 8, there is shown a timing diagram for pulse width regulation of the switching control signals P1 and P2 performed in the predriver 36. Referring again to. FIG. 7 and referring back to FIG. 5 illustrating a pulse width regulation circuit, the pulse width regulation will now be described.

It is seen in FIG. 7 that when the mode instruction signal MOD is goes up to H level, the third counter 61 starts counting clock pulses of the clock CK to generate a delay signal Sd, until it counts the number of clock pulses that amounts to the third predetermined period T3. As the switch SW1 is turned on by the delay signal Sd, the delay capacitor Cd is connected between the output end of the inverter INV1 and the ground during the third predetermined period T3.

When the delay capacitor Cd is connected, the rise and fall of the inverter INV1 are delayed in accordance with the capacitance of the delay capacitor Cd. Then, since the drive capability of the PMOS transistor of the inverter INV1 is smaller than that of the NMOS transistor, the pulse width of L level pulse output from the inverter INV2 is shortened. Hence, the width of the pulse output from the inverter INV2 becomes smaller than that of the pulse input into the inverter INV1. Since the switching control signals P1 and P2 are formed in accordance with the pulse output from the inverter INV2, the on-periods of the MOS transistors 31 and 32 are shortened, and the dead time is extended accordingly.

FIG. 8 shows the waveforms of the switching control signals P1 and P2 involved in switching the DC-DC converter section 30 from a disabled condition to an enabled condition. When the DC-DC converter section 30 is in a disabled condition, the switching control signal P1 has H-level, the switching control signal P2 has L level, and both of the MOS transistors 31 and 32 are turned off.

As the DC-DC converter section 30 is enabled from a disabled condition, the PWM comparator 35 generates a PWM signal Pwm having a width determined by the comparison made by the comparator 35, which is supplied to the predriver 36. However, in the third predetermined period T3 after the DC-DC converter section 30 is enabled, the on-periods of the MOS transistors 31 and 32, for which the switching control signals P1 and P2 has L level and H level, respectively, are shortened, thereby, extending the dead time Td1 during the third predetermined period T3.

As the third predetermined period T3 has elapsed, the delay signal Sd is no longer output, thereby turning off the switch SW1. As a consequence, the dead time Td2 that follows will have the normal length under normal operating condition.

The third predetermined period T3 is preferably started simultaneously with the first predetermined period T1 for an overlapping operation. Moreover, the third predetermined period T3 is preferably not longer than the first predetermined period T1, that is, T3≦T1.

It is noted that the third counter 61 also starts counting clock pulses of the clock CK when the mode instruction signal MOD goes down from H level to L level as shown in FIG. 7, and generates a delay signal Sd for the fourth predetermined period T4, beginning simultaneously with counting clock pulses for the period T4. Since the switch SW1 is turned on by the delay signal Sd, the delay capacitor Cd is connected between the output end of the inverter INV1 and the ground during the fourth predetermined period T4. In this case also, as in the third predetermined period T3, the dead time is extended.

This fourth predetermined period T4 preferably has a length not longer than that the second predetermined period T2 for an overlapping operation, that is, T4≦T2, and preferably ends simultaneously with the second predetermined period T2. As a consequence, the then fourth predetermined period T4 is started at, or a little after, the moment when the mode instruction signal MO D goes down from H level to L level.

Thus, pulse widths of the switching control signals P1 and P2 are shortened to extend the dead time Td1 when the DC-DC converter section 30 is switched from its disabled condition to an enabled condition and vice versa. As a consequence, generation of free oscillations and overshoots accompanying the free oscillation that could take place in the smoothing coil Lo and the smoothing capacitor Co during switching between the DC-DC converter section 30 and the LDO regulator 20 is suppressed. It should be appreciated that the shortening of the pulse widths is carried out in a simple manner, by connecting the delay capacitor Cd to either one of the cascaded inverters INV1, INV2, ... of predriver 36 for the predetermined periods T3 and T4.

FIGS. 9-13 show a structure of a power supply unit according to a second embodiment of the invention, along with a relevant timing diagram. The DC-DC converter section 30 and the switching circuit 40 of the second embodiment are basically the same in structure as the ones shown in FIGS. 1-3.

Figure 9:
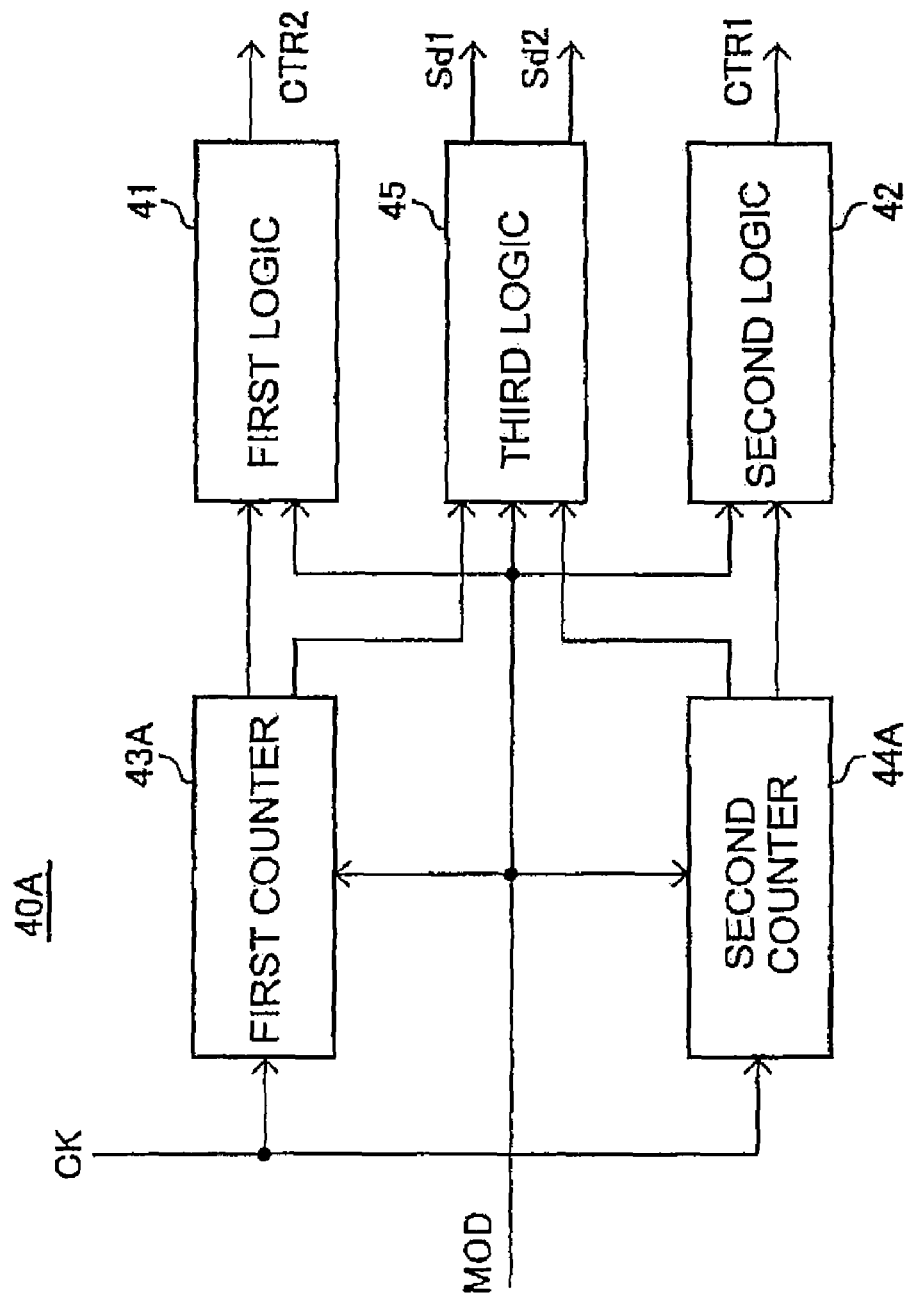
FIG. 9 is a diagram showing the structure of a switching circuit in accordance with a second embodiment of the invention.

A first and a second logic circuits 41 and 42, respectively, shown in FIG. 9 are the same as those shown in FIG. 4. A third logic circuit 45 generates a first delay signal Sd1 and a second delay signal Sd2 in sequence during an overlapping period. To do this, the mode instruction signal MOD and predetermined count outputs of the first and second counters 43A and 44A, respectively, are input to the third logic circuit 45. Other features of the. embodiment are the same as of FIG. 4.

Figure 10:
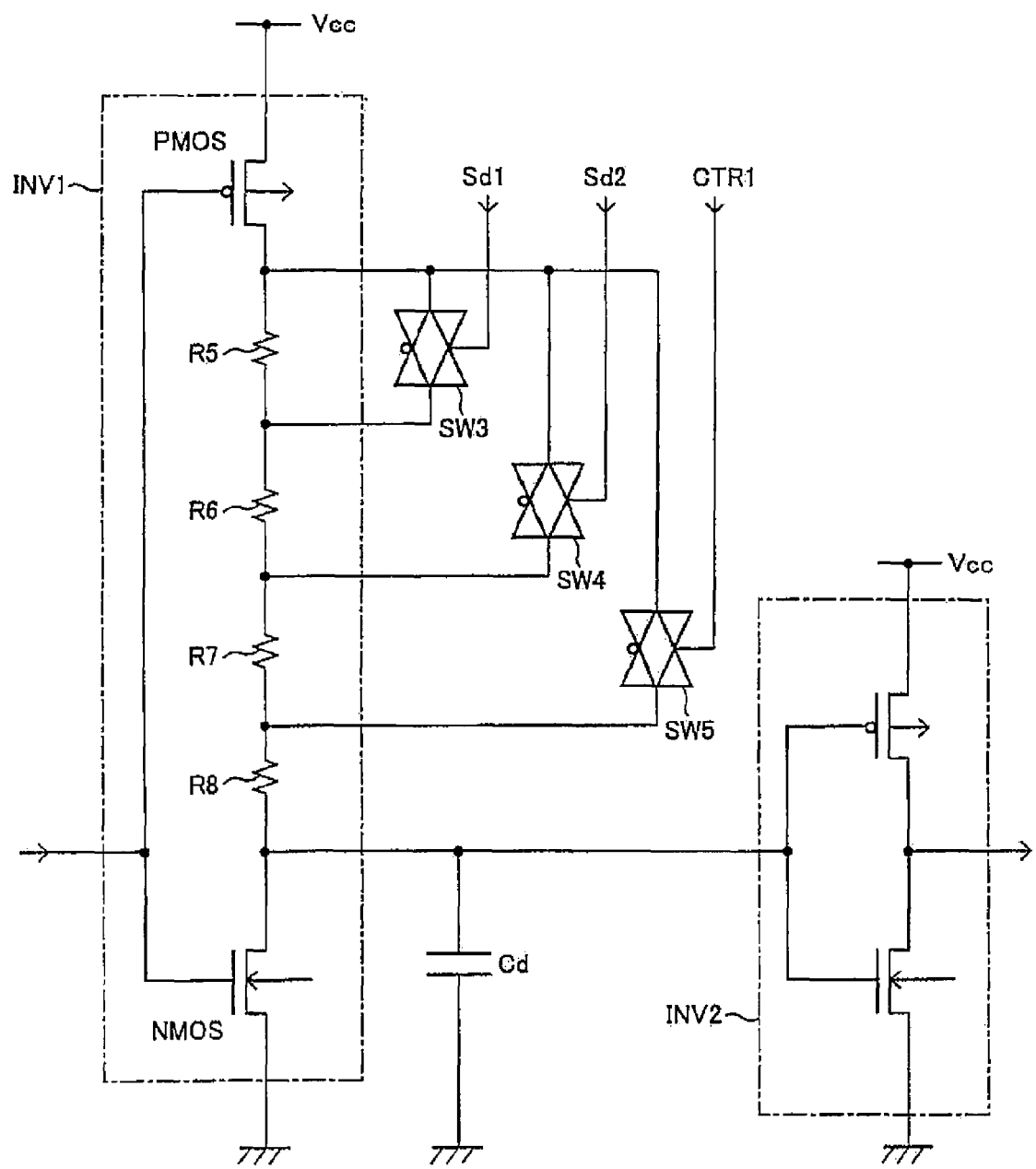
FIG. 10 is a diagram showing the exemplary structure of. delay time control means in accordance with the second embodiment of the invention.

FIG. 10 shows the structure of a further predriver 36 having delay time control means for regulating the pulse widths of the switching control signals P1 and P2 in multiple stages.

As shown in FIG. 10, resistors R5-R8 are connected in series between the output end of the inverter INV1 and the drain of the PMOS transistor of the inverter INV1. A switch SW3 is connected in parallel with the resistor R5, a switch SW4 in parallel with the resistors R5 and R6, and a switch SW5 in parallel with resistors R5-R7. The switch SW3 is controlled by the first delay signal Sd1, the switch SW4 by the second delay signal Sd2, and the switch SWS by the first enable signal CTR1. Thus, in the second embodiment shown herein, the DC-DC converter section 30 is supplied with the first enable signal CTR1 in addition to the second enable signal.

In the delay time control means of FIG. 10, the time constant determined by the resistors R5-R8 and the capacitor Cd is gradually shortened in several steps by turning on the switches SW3-SW5 in sequence when the DC-DC converter section 30 is enabled, thereby changing the dead time in multiple steps from a predetermined long time to a predetermined short time.

When the DC-DC converter section 30 is disenabled, the time constant determined by the resistor R5-R8 and the capacitor Cd is gradually increased in multiple steps by turning off the switches SW5-SW3 in sequence, thereby changing the dead time from the predetermined short time to the predetermined long time in multiple steps.

Instead of extending the dead time at the beginning and the end of an operation of the DC-DC converter section 30, the dead time may be extended only at the beginning of the operation.

Referring to the timing diagrams of FIG. 11-13, operation of the second embodiment of the invention will now be described.

Figure 11:
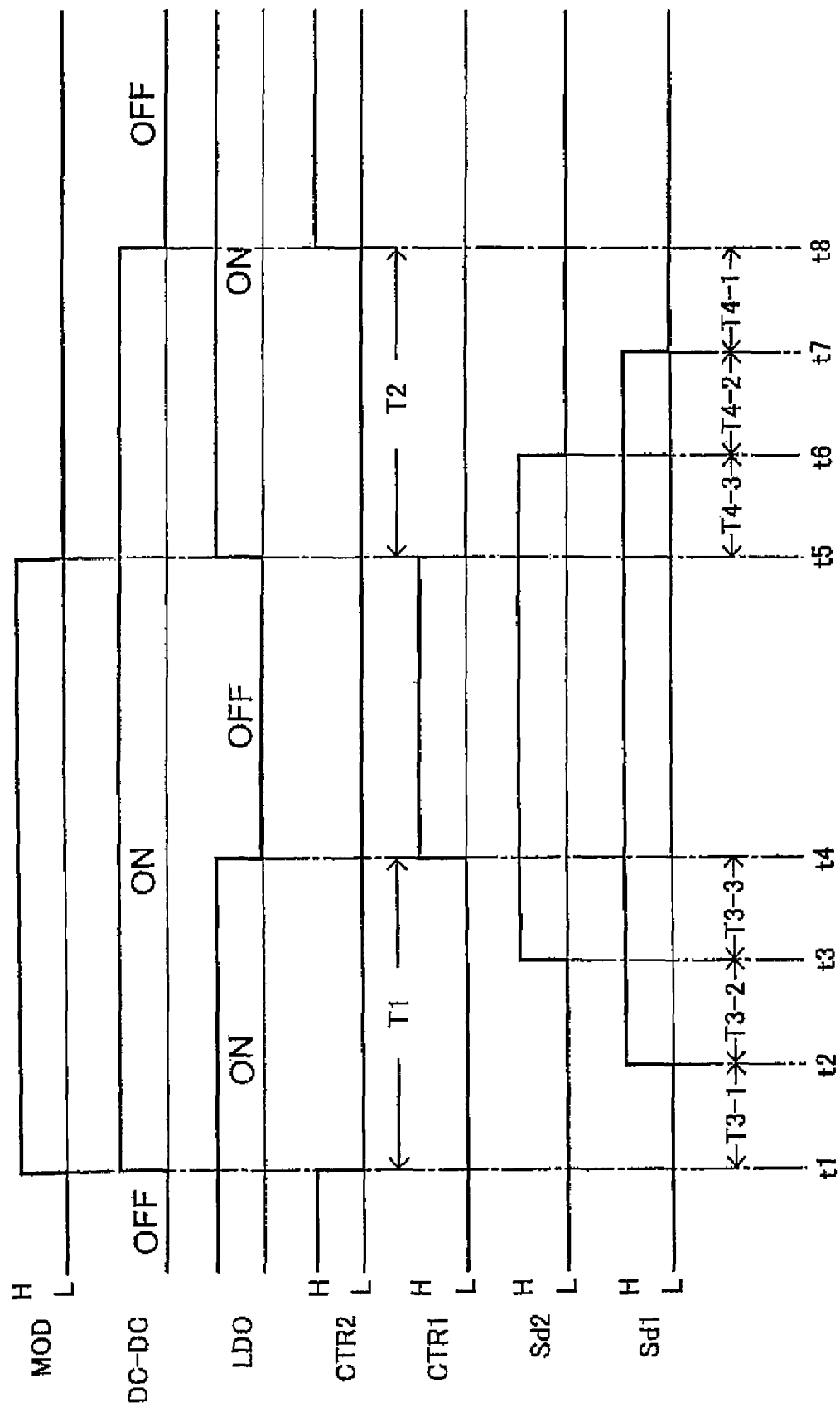
FIG. 11 is a timing diagram used in the second embodiment of the invention.

FIG. 11 shows the timing relationship among the mode instruction signal MOD, LDO regulator 20 (denoted by LDO), DC-DC converter section 30 (denoted by DC-DC), first and second enable signals CTR1 and CTR2, respectively, and first and second delay signals Sd1 and Sd2, respectively.

As seen in FIG. 11, before time t1, the mode instruction signal MOD issued from the controller 60 has L level, the first enable signal CTR1 L level, the LDO regulator 20 is in operation, the second enable signal CTR2 has H level; and the DC-DC converter section 30 is disabled (halted).

As the mode instruction signal MOD goes up from L level to H level at time t1, the second enable signal CTR2 is immediately pulled down to L level, enabling the DC-DC converter section 30.

The startup of the DC-DC converter section 30 results in generation of a clock CK. The first enable signal CTR1 is pulled up to H level at time t4 (i.e. when the first predetermined period T1 has elapsed after time t1). The period T1 is determined based on the predetermined number of clock pulses of the clock CK counted by a first counter 43A after t1. When the first enable signal CTR1 is pulled up to H level, the LDO regulator 20 will be stopped.

During a period T3-1 from t1 to t2 in the first predetermine period T1, all the switches SW3-SW5 are turned off. During the next period T3-2 from t2 to t3, the switch SW3 is turned on; the switch SW4 is turned on in the period T3-3 from t3 to t4; and the switch SW5 turned on after t4.

Accordingly, the dead time is sequentially changed in multiple steps from the shortest time to the longest time in each of the periods T3-1-T3-3 within the first predetermined period T1 (between t1 and t4).

It is seen in FIG. 11 that, before time t5, the mode instruction signal MOD issued from a controller 60 has H level, the first enable signal CTR1 H level causing the LDO regulator 20 to be disabled, and the second enable signal CTR2 L level, thereby causing the DC-DC converter section 30 to be in operation.

When the mode instruction signal MOD goes down from H level to L level at t5, the first enable signal CTR1 is immediately pulled down to L level, bringing the LDO regulator 20 into operation.

Since the DC-DC converter section 30 is still in operation after time t5, the clock CK is continually generated. Based on the number of clock pulses of the clock CK counted by the second counter 44A that amounts to the second predetermined period T2 after t5, the second enable signal CTR2 is pulled up to H level at the end of the second period T2, i.e. at time t8. As the second enable signal CTR2 is pulled up to H level, the DC-DC converter section 30 is stopped.

All the switches SW3-SW5 are turned on before t5. In the second predetermined period T2, the switch SW5 is turned off while the switches SW4 and SW3 are turned on over the period T4-3 from t5 to t6. The switch SW4 is turned off for the subsequent period T4-2 from t6 to t7. The switch SWS is turns off for the period T4-1 from t7 to t8.

As a result, the dead time is changed from the shortest time to the longest time in multiple steps over the period from t5 to t8, i.e. in the respective periods T4-3 through T4-1.

Figure 12:
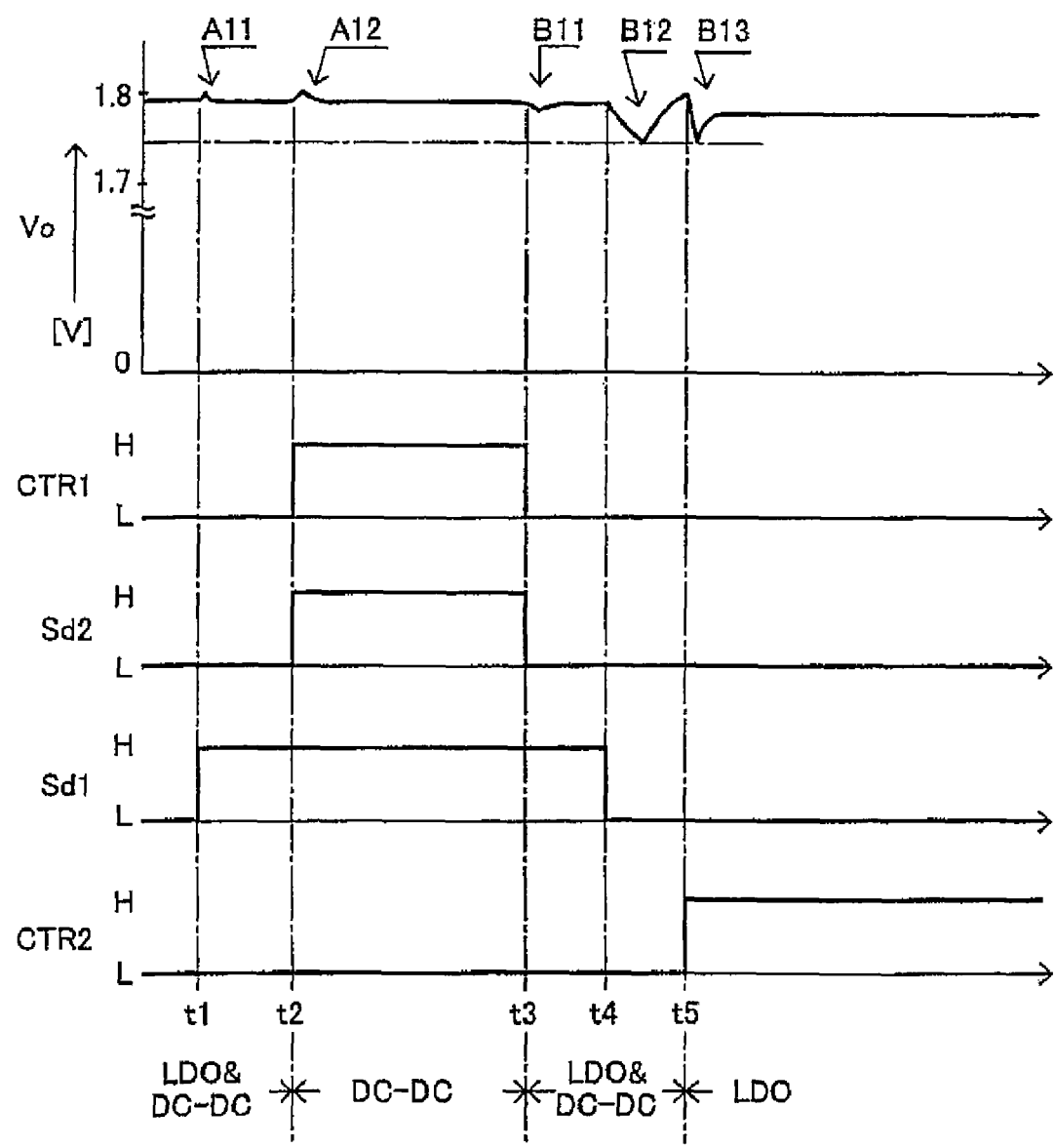
FIG. 12 is a diagram describing multi-stage switching operation in accordance with the second embodiment of the invention.

FIG. 12 is a timing diagram illustrating, together with the output voltage Vo, two-stage switching of the dead time in the switching of the DC-DC converter section 30 and the LDO regulator 20 in an overlapping manner. In the example shown in FIG. 12, the first enable signal CTR1 and the second delay signal Sd2 change simultaneously.

Figure 13:
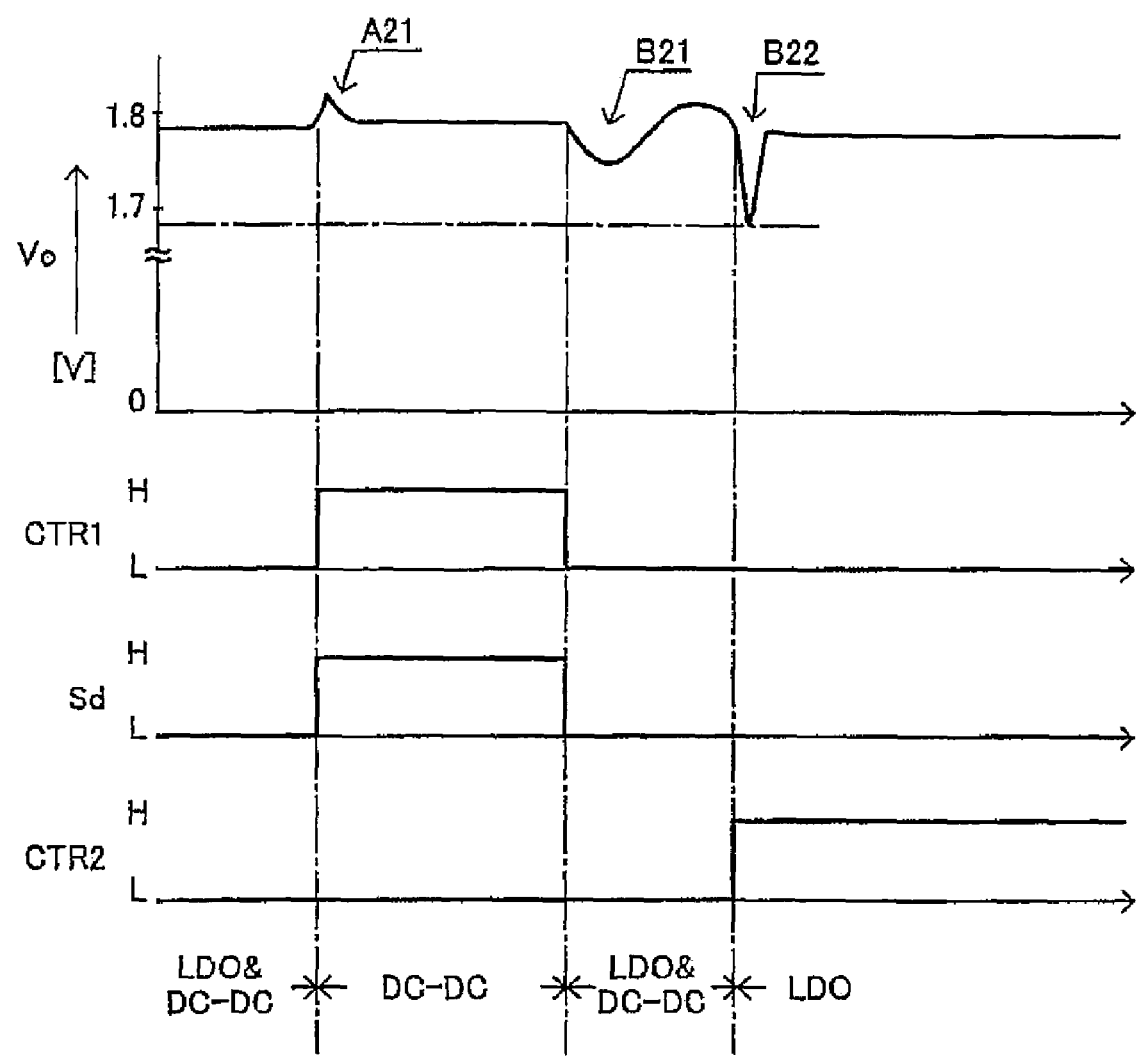
FIG. 13 is a diagram describing one-stage switching operation to be compared with the operation of FIG. 12.

FIG. 13 illustrates switching to be contrasted with the two-stage switching of the dead time as shown in FIG. 12. More particularly, FIG. 13 shows the output voltage Vo and a timing diagram of the dead time that is switched in one-stage during the switching of the DC-DC converter section 30 and the LDO regulator 20. In the example shown in FIG. 13, the first enable signal CTR1 and the delay signal Sd change simultaneously, wherein the dead time is long during an overlapping period but is short during a period in which the DC-DC converter section 30 is in operation.

In FIGS. 12 and 13, "LDO&DC-DC" indicates a period in which both the DC-DC converter section 30 and the LDO regulator 20 are in overlapping operation (regulator mode), and "DC-DC" indicates a period in which only the DC-DC converter section 30 is in operation (converter mode). In FIGS. 12 and 13, the abscissa represents time.

It is seen from FIGS. 12 and 13, that overshoots (as indicated by A11 and A12) accompanying switching of the DC-DC converter section 30 and the LDO regulator 20 with two-stage dead time are small as compared with the overshoots (as indicated by A21) accompanying switching with one-stage dead time. Moreover, undershoots (as indicated by B11-B13) accompanying a switching of the DC-DC converter section 30 and the LDO regulator 20 with two-stage dead time switching as shown in FIG. 12 are smaller as compared with the undershoots (indicated by B21 and B22) with one-stage dead time switching as shown in FIG. 13. For example, it is seen in FIGS. 12 and 13 that the output voltage Vo of 1.8V falls below 1.7V in the undershoot B22, in contrast to the undershoots B12 or B13 in which Vo falls as low as 1.75V.

Thus, multi-stage switching of the dead time during switching of the DC-DC converter section 30 and the LDO regulator 20 ensures further suppression of free oscillations and accompanying overshoots and undershoots.

Figure 14:
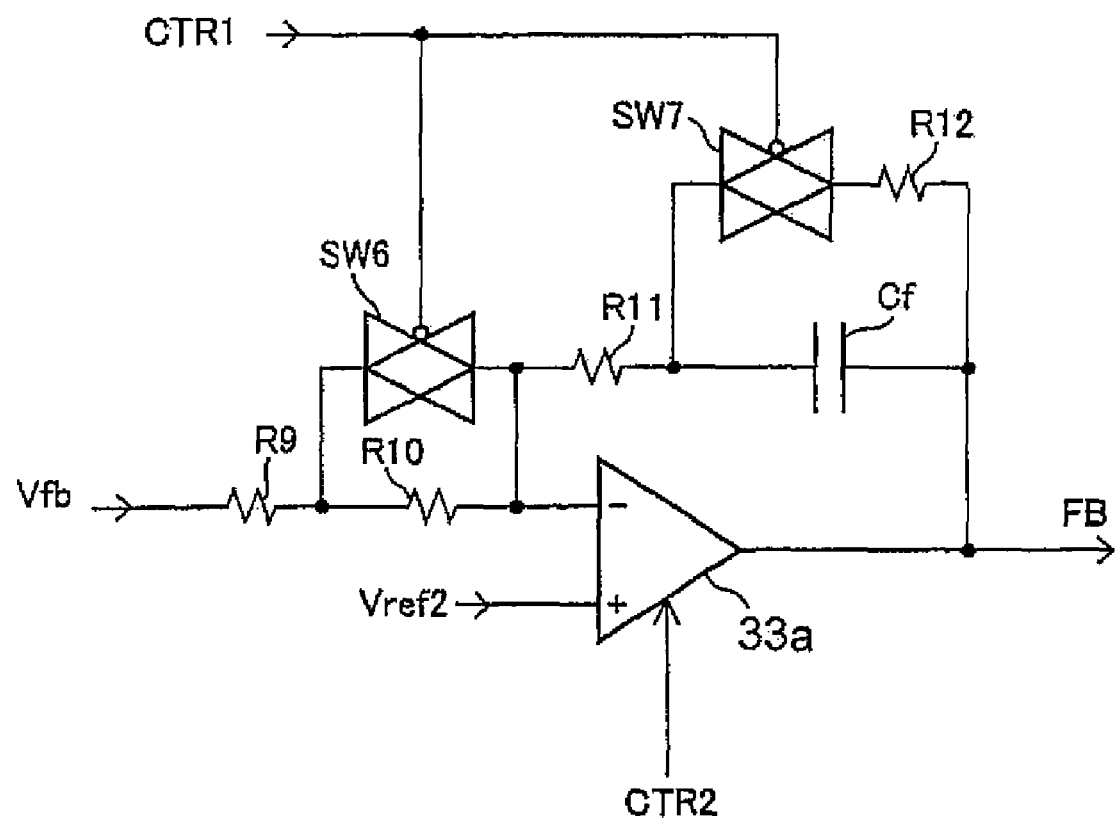
FIG. 14 is a diagram showing the structure of an error amplification circuit in accordance with a third embodiment of the invention.
Figure 15:
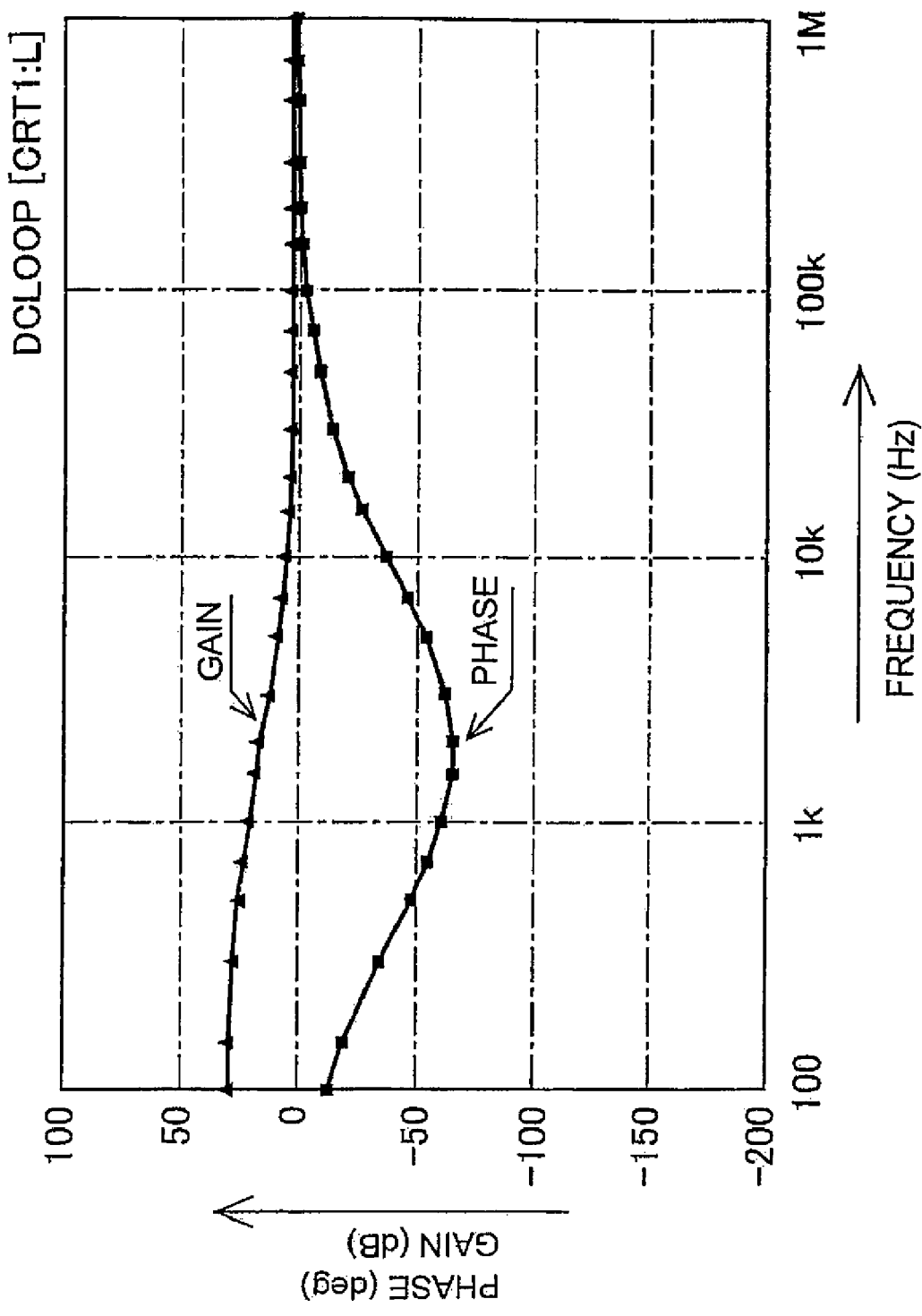
FIG. 15 is a diagram showing the frequency-gain characteristic of DC feedback in accordance with the third embodiment of the invention.
Figure 16:
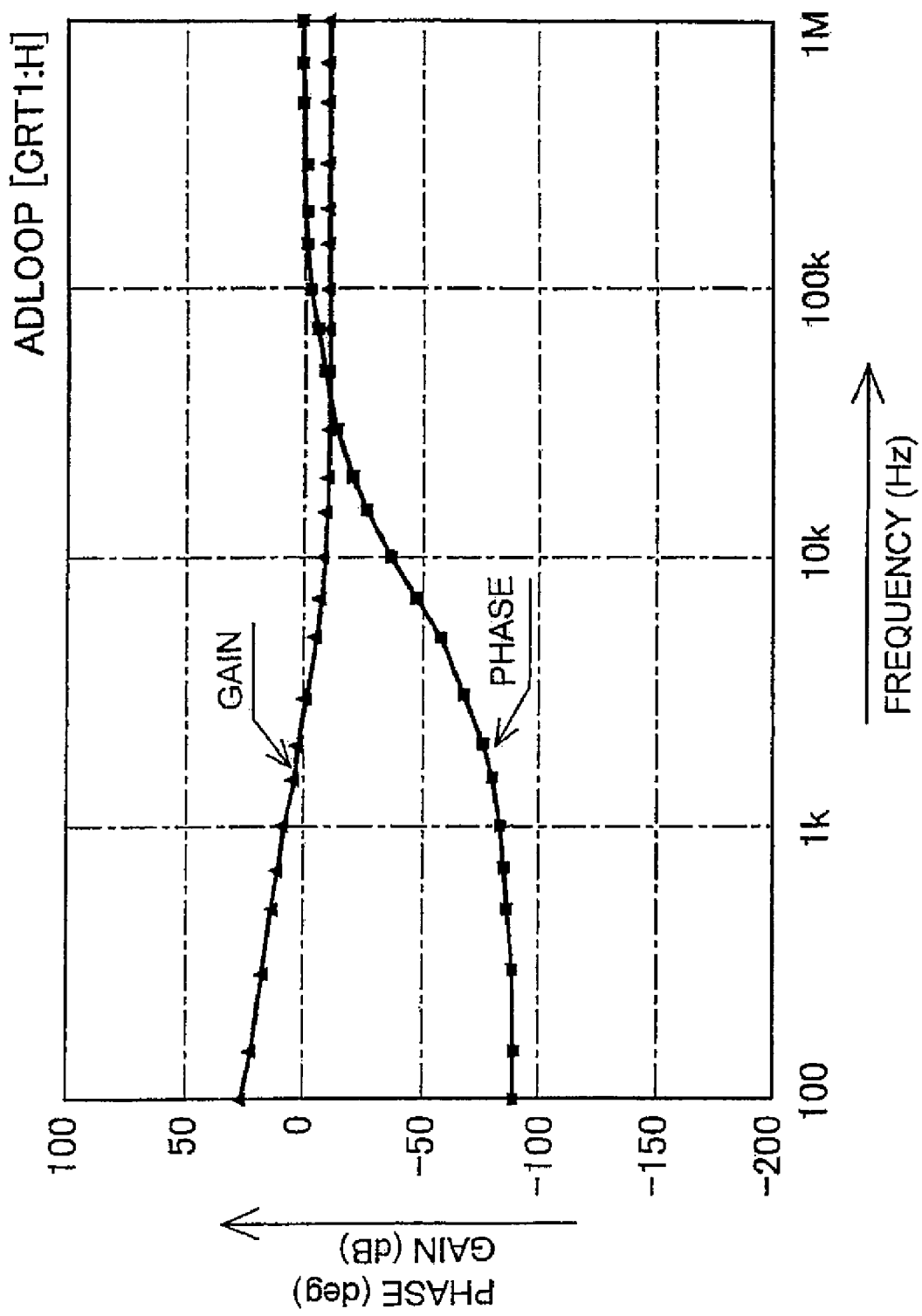
FIG. 16 is a diagram showing the frequency-gain characteristic of AC feedback in accordance with the third embodiment of the invention.

FIGS. 14-16 shows a power supply unit in accordance with a third embodiment of the invention and its gain and phase characteristics as functions of frequency.

FIG. 14 shows in detail the structure of an error amplification circuit 33 of the third embodiment, explicitly showing its error amplifier 33a and feedback loops. The error amplification circuit 33 corresponds to the error amplification circuit 33 of FIG. 3. In this configuration, the feedback voltage Vfb is input to the inverting input end of the error amplification circuit 33 via serially connected resistors R9 and R10. In addition, a resistor R11 and the feedback capacitor Cf are connected in series between the output end of the error amplification circuit 33 and the inverting input end thereof. A switch SW7 and a resistor R12 connected in series are connected in parallel with the feedback capacitor Cf. A switch SW6 is connected in parallel with a resistor R10.

These switches SW6 and SW7 are controlled by the first enable signal CTR1. When the first enable signal CTR1 has H level, allowing only the DC-DC converter section 30 to be in operation, the switches SW6 and SW7 are turned off. As a consequence, an AC feedback circuit (AC feedback loop) is formed by the resistors R9 (of 75 kΩ for example), R10 (of 275 kΩ for example), and R11 (of 100 kΩ for example) and the feedback capacitor Cf (of 200 pF for example). When the DC-DC converter section 30 alone is in operation, the error amplification circuit 33 is in operation with the AC feedback circuit.

On the other hand, when the first enable signal CTR1 has L level, so that the DC-DC converter section 30 is in overlapping operation with the LDO regulator 20, the switches SW6 and SW7 are turned on. As a consequence, the resistor R10 is short-circuited and the resistor R12 (of 2 MΩ for example) is connected in parallel with the feedback capacitor Cf, thereby forming a DC feedback circuit (DC feedback loop). When the DC-DC converter section 30 is in overlapping operation with the LDO regulator 20, the error amplification circuit 33 is in operation with the DC feedback loop.

When the error amplification circuit 33 is in operation with the DC feedback loop, the error amplification circuit has a higher gain in a high frequency domain as compared with the gain obtained by the AC feedback loop, which improves the response of the circuit in the high frequency domain.

FIG. 15 shows the gain and phase characteristics of the error amplification circuit 33 as functions of frequency when operating with the DC feedback loop. FIG. 16 shows the gain and phase characteristics of the amplification circuit 33 as functions of frequency when operating with the AC feedback loop.

Comparing the frequency-gain characteristics of FIGS. 15 and 16, it is seen that the DC feedback loop gives a larger gain in the high frequency domain than the AC feedback loop.

Thus, by switching the AC feedback loop of the circuit 33 to the DC-feedback circuit during an overlapping period, the gain of the error amplification circuit 33 can be raised in a high frequency domain, thereby improving the response of the circuit 33, which in turn helps lessen the influence of free oscillations, overshoot, and undershoots pertinent to the switching between the DC-DC converter and the series regulator on the output voltage.

It will be understood that the switching from the AC feedback circuit to the DC feedback circuit during an overlapping period may be also employed in the first and the second embodiments, as in the third embodiment. In that case, further suppression of the influence of switching between the LDO regulator 20 and the DC-DC converter section 30 on the output voltage Vo can be anticipated.

The invention has been described above with particular reference to embodiments in which a counter is provided in each of the blocks 30 and 40 to set up a predetermined dead time. However, the counter may be substituted for by an alternative delay circuit formed of a capacitor and a resistor, or by a clock signal obtained by frequency-dividing the clock generated by the controller. 60. Although the invention has been described for a power supply unit that utilizes a series regulator and a switching DC-DC converter (of voltage step-down type), a person skilled in the art will understand that the invention can be applied to other types of power supply circuits having similar functions.

I claim:

1. A power supply unit comprising:
a first power supply circuit for converting an input voltage into a predetermined output voltage, said first power supply circuit having a power conversion efficiency that is high for a light load but decreases with the magnitude of said load; and
a second power supply circuit for converting said input voltage into an output voltage, said second power supply circuit having an output end connected to the output end of said first power supply circuit and having a power conversion efficiency that is lower than said high efficiency of said first power supply circuit for a light load but increases with the magnitude of said load and exceeds that of said first power supply circuit when said load exceeds a threshold, wherein
said first and second power supply circuits are switchable depending on the magnitude of the power to be supplied from said power supply circuits to said load,
said first and second power supply circuits are in operation simultaneously to supply their power for a common overlapping period when switching is made between said first and second power supply circuits, and
said switching is carried out in advance prior to an actual increase or decrease in load based on a prediction that the power to be supplied from said first and second power supply circuits to said load would increase or decrease via said threshold.

2. The power supply unit according to claim 1, wherein:
said second power supply circuit is a switching DC-DC converter.

3. The power supply unit according to claim 2, wherein:
said switching DC-DC converter includes an error amplification circuit for controlling said output voltage in accordance with the difference between a reference voltage and a voltage representing said output voltage, said error amplification circuit having an AC and a DC feedback circuits that are switchable from said AC feedback circuit to said DC feedback circuit during said overlapping period.

4. The power supply unit according to claim 2, wherein said switching DC-DC converter includes:
a first and a second switches connected in series between power sources, said first and second switches adapted to turn on alternately but turn off simultaneously for a dead time;
a smoothing coil and a smoothing capacitor for smoothing the switching voltage appearing at the node of said first and second switches to generate said output voltage; and
a pulse width control circuit for generating, and providing said first and second switches with, a switching control signal based on a PWM signal that is modulated so as to enable generation of said predetermined output voltage; and wherein
said pulse width control circuit is adapted to shorten the width of said PWM signal based on said mode instruction signal to extend said dead time by a third or a fourth predetermined period when said switching DC-DC converter is enabled from its disabled state or disabled from its enabled state.

5. The power supply unit according to claim 2, wherein said switching DC-DC converter includes:
a first and a second switches connected in series between power sources, said first and second switches adapted to turn on alternately but turn off simultaneously for a dead time;
a smoothing coil and a smoothing capacitor for smoothing the switching voltage appearing at the node of said first and second switches to generate said output voltage; and
a pulse width control circuit for generating, and providing said first and second switches with, a switching control signal based on a PWM signal that is modulated so as to enable generation of said predetermined output voltage; and wherein
said pulse width control circuit is adapted to shorten said dead time in multiple stages from a predetermined long time to a predetermined short time by regulating the width of said PWM signal when said switching DC-DC converter is enabled from its disabled state, and/or adapted to extend said dead time in multiple stages from a predetermined short time to a predetermined long time by regulating the width of said PWM signal when said switching DC-DC converter is disabled from its enabled state.

6. A portable apparatus, comprising:
a battery for generating a source voltage;
a power supply unit supplied with said source voltage as an input voltage thereto as defined in claim 1; and
control means for controlling said power supply unit.

* * * * *